US006424962B1

(12) United States Patent
Billon

(10) Patent No.: US 6,424,962 B1
(45) Date of Patent: Jul. 23, 2002

(54) METHOD OF AUTOMATED PROVING FOR UNRESTRICTED FIRST-ORDER LOGIC

(75) Inventor: Jean-Paul Billon, Andresy (FR)

(73) Assignee: Bull S.A., Louveciennes (FR)

( * ) Notice: Subject to any disclaimer, the term of this patent is extended or adjusted under 35 U.S.C. 154(b) by 1201 days.

(21) Appl. No.: 08/934,393

(22) Filed: Sep. 19, 1997

Related U.S. Application Data

(63) Continuation of application No. 08/330,864, filed on Oct. 28, 1994, now abandoned.

(30) Foreign Application Priority Data

Nov. 26, 1993 (EP) .......................................... 93402874

(51) Int. Cl.$^7$ ................................................ G06N 5/04
(52) U.S. Cl. ...................................................... 706/61
(58) Field of Search .......................... 395/10 R, 50–51, 395/55, 66–67; 704/1; 706/17, 46, 50, 52; 707/104

(56) References Cited

U.S. PATENT DOCUMENTS

| | | | | |
|---|---|---|---|---|
| 5,058,033 A | * | 10/1991 | Bonissone et al. | 364/513 |
| 5,438,511 A | * | 8/1995 | Maxwell, III et al. | 364/419.01 |
| 5,544,067 A | * | 8/1996 | Rostoker et al. | 364/489 |

OTHER PUBLICATIONS

Andrews, Peter B., "Refutations by Matings", IEEE TRansactions on Computers, vol. C–25, No. 8, pp. 801–807, Aug. 1976.*
Andrews, Peter B., "Theorem Proving via General Matings", Journal of the Association for Computing Machinery, vol. 28, No. 2, pp 193–214, Apr. 1981.*
Baader, Franz, "Unificaiton in Commutative Theories, Hilbert's Basis Theorem, and Grobner Bases", Journal of the Association of Computing Machinery, vol. 40, No. 3, pp. 477–503, Jul. 1993.*
Bibel, Wolfgang, "On Matrices with Connections", Journal of the Association for computitng Machinery, vol. 28, No. 4, pp. 633–645, Oct. 1981.*
Bibel, Wolfgang, "Matings in Matrices", Communications of the ACM, vol. 26, No. 11, pp. 844–852, Nov. 1983.*
Bryant, Randal E., "Graph–Based Algorithms for Boolean Function Manipulation", IEEE Transactions on Computers, vol. C–35, No. 8, pp. 677–691, Aug. 1986.*
Bryant, Randal E., "Symbolic Boolean Manipulation with Ordered Binary–Decision Diagrams", ACM Computing Surveys, vol. 24, No. 3, pp. 293–318, Sep. 1992.*
Deverchere, Philippe, et al., "Functional Abstraction and Formal Proof of Digital Circuits", European Design Automation Conference, pp. 458–462, 1992.*
Henschen, Lawrence J., "Introduction: Tutorial on Resolution", IEEE Transactions on Computers, vol. C–24, No. 8, pp. 769–772, Aug. 1976.*

Gallier, Jean, et al., "Theorem Proving Using Equational Matings and Rigid E–Unification", Journal of the Association of Computing Machinery, vol. 39, No. 2, pp. 377–429, Apr. 1992.*
Johnson, C.A., "Factorization and Circuit in the Connection Method", Journal of the Association for Computing Machinery, vol. 40, No. 3, pp. 536–557, Jul. 1993.*
Joyner, William H. Jr., "Resolution Strategies as Decision Procedures", Journal of the Association for Computing Machinery, vol. 23, No. 3, pp. 398–417, Jul. 1976.*
Kowalski, Robert, "A Proof Procedure Using Connection Graphs", Journal of the Association for Computing Machinery, vol. 22, No. 4, pp. 572–595, Oct. 1975.*
Letz, R., et al., "Setheo: A High–Performance Theorem Prover", Journal of Automated Reasoning, vol. 8, pp. 183–212, 1992.*
Loveland, D.W., "A Simplified Format for the Model Elimination Theorem–Proving Procedure", Journal of the Association for Computing Machinery, vol. 16, No. 3, pp. 349–363, Jul. 1969.*
Madre, Jean C., et al., "Formal Verification and Diagnosis of Digital Circuits Using a Propositional Theorem Prover", CAD Systems in Al, North–Holland: Amsterdam, pp. 101–108, Jul. 6, 1989.*
Madre, Jean C., et al., "Automating the Diagnosis and the Rectification of Design Errors with PRIAM", Internation Conference on Computer–Aided Design, pp. 30–33, 1989.*
Madre, Jean C., et al., "Formal Verification in an Industrial Design Environment", International Journal of Computer Aided VLSI Design, vol. 2, pp. 391–417, 1990.*

(List continued on next page.)

*Primary Examiner*—James P. Trammell
*Assistant Examiner*—Daniel L. Greene
(74) *Attorney, Agent, or Firm*—Edward J. Kondracki; Miles & Stockbridge P.C.

(57) ABSTRACT

A method of automated proving for unrestricted first-logic to test the satisfiability of clause sets describing an industrial system which applies the instance generation rule $$(IG) \quad \frac{\Psi}{\Psi\sigma}$$

where $\Psi$ is a term, $\sigma$ a substitution and $\Psi\sigma$ an instance of $\Psi$ yielded by the substitution $\sigma$, and is characterized in that, instance subtraction is defined as the substraction of the instance $\Psi\sigma$ from $\Psi$ resulting in a generalized term which is a triplet $<\Psi, \sigma, \Lambda>$ where $\Lambda$ is a finite set of standard substitutions $\{\lambda_1, \ldots, \lambda_n\}$ and defined by $$GE(<\Psi, \sigma, \Lambda>) = GE(\Psi\sigma) - GE(\{\Psi\lambda_1, \ldots, \Psi\lambda_n\})$$

the method further applies an instance subtraction combined with said instance generation rule to get an instance extraction rule defined by $$(IE)\Sigma \rightarrow (\Sigma - \{\Psi<\sigma,\Lambda>\}) \cup \{\Psi<\sigma\mu,\Lambda^*\sigma\mu>, \Psi<\sigma,\Lambda\cup\{\sigma\mu\}>)$$

where $\Sigma$ is a set of clauses and $\mu$ is a substitution valid for the generalized term $\Psi<\sigma, \Lambda>$, whereby the set $\Sigma$ can be proven unsatisfiable.

27 Claims, No Drawings

OTHER PUBLICATIONS

Madre, Jean C., et al., "The Formal Verification Chain at Bull", EURO ASIC 1990, pp. 474–479, 1990.*

Murray, Neil V., and Rosenthal, Erik, "Dissolution: Making Paths Vanish", Journal of the Association for Computing Machinery, vol. 40, No. 3, pp. 504–535, Jul. 1993.*

Robinson, J.A., "A Machine–Oriented Logic Based on the Resolution Principle", Journal of the Association for Computing Machinery, vol. 12, No. 1, pp 23–41, Jan. 1965.*

Proc. 4th Int. Conf. on Computing and Information May 28, 1992, IEEE, Los Alamitos, US pp. 228–232 Shie–Jue Lee et al. "Use Of Unit Clauses And Clause Splitting In Automatic Deduction" p. 231, left col., line 3 p. 232, left, col., line 42.

Journal of Automated Reasoning, vol. 9, No. 1, Aug. 1992 Kluwer, Netherlands, pp. 25–42 Shie–Jue Lee et al. "Eliminating Duplication With The Hyper–Linking Strategy" Abstract, p. 34, line 4–line 26.

Artificial Intelligence, vol. 36 No. 2, Sep. 1988 Amsterdam, NL, pp. 149–176 XP120118 Wray Buntine, "Generalized Subsumption And Its Applications To Induction And Redundancy", p. 166, line 34–p. 167, line 16.

Proc. Australian Joint Int. Conf. —AI Jan. 2, 1987, Sydney, Australia pp. 553–566 Graham Wrightson, "Semantic Tableaux And Links" p. 560, line 18–p. 561, line 19.

IEEE Transaction on Computers, vol. C–25, No. 4, Apr. 1976, New York, US, pp. 323–327 David Gelperin, "A Resolution–Based Proof Procedure Using Deletion–Directed Search" abstract, p. 324, left col., line 14–p. 325, right col., line 21.

Theoretical Computer Science, vol. 103, No. 2, Sep. 14, 1992, Elsevier, Holland pp. 283–309 Byeong Man Kim et al. "A New Subsumption Method In The Connection Graph Proof Procedure" p. 285, line 8–p. 286, line 4.

* cited by examiner

METHOD OF AUTOMATED PROVING FOR UNRESTRICTED FIRST-ORDER LOGIC

This is a Continuation, or application Ser. No. 08/330,864, filed Oct. 28, 1994 abandoned.

BACKGROUND OF THE INVENTION

The invention relates to a method of automated proving for unrestricted first-order logic to test the satisfiability of clause sets describing an industrial system, the resulting automated proving tool and industrial system, and the information carrier incorporating a program carrying out the method.

FIELD OF THE INVENTION

Automated proving is concerned with the fundamental task of establishing the satisfiability or unsatisfiability of formula sets including cl use sets. A computational method dedicated to this task is called a proof method. Automated proving is involved in various logical computations which will be here covered by the global notion of automated reasoning: e.g. computation of counter-models of formula sets, automated theorem proving, computation of maximal satisfiable subsets of unsatisfiable sets of formulas, computation of minimal support of theorems, etc. The invention can be used by any industrial application where first-order logic automated reasoning can be explicitely or implicitely involved.

First-order logic has become of industrial interest through a restricted sublogic known as Horn clause logic. Horn clause formalism is used by logic programming languages like PROLOG both as a declarative and imperative language. The wide variety of applications which can be achieved with logic programs illustrates the versatility of Horn clause logic in expressing various problems (for example, see: "Artificial Intelligence through PROLOG", Prentice Hall 1988, Rowe, N. C.). But in many cases the expressive power of Horn clause logic is not sufficient: unrestricted first order logic, and even higher-order logic, is needed. How to use unrestricted first-order logic in expressing problems or in describing digital circuits, computer programs, complex systems, etc, and how first-order logic automated reasoning allows computers to solve such problems is explained in many classical textbooks (for example, see: "Automated Reasoning", Prentice Hall,1984, Wos, L. et al.).

Thus, beyond those related to Horn clause logic programming, there is a wide range of industrial applications where, explicitely or implicitely, first-order logic automated reasoning can be involved and the invention used, among which can be mentioned, for example:

General purpose automated reasoning systems: general purpose automated reasoning systems can be sold or distributed as stand-alone products (software products or dedicated machines) and/or within packages. They can be used to train or help mathematicians, logicians, computer scientists and any kind of end-users in checking and/or proving the validity and/or the satisfiability and/or the unsatisfiability of all kinds of statements which can be expressed in the forms accepted by the end-user interfaces and which can be translated in logic, this including among others various logical formalisms, pseudo-natural languages, graphic inputs, and any kind of dialog based interactions with users. General purpose automated reasoning systems may also provide more sophisticated functionalities, based on the computation of maximal satisfiable subsets of unsatisfiable sets of statements and/or the computation of minimal unsatisfiable subsets of given sets of statements. General purpose automated reasoning systems may also be used by other devices (softwares or hardwares) through various specific communication channels.

Truth maintenance systems: truth maintenance systems can be sold and/or distributed as stand-alone products or within artificial intelligence packages. They are oriented toward automatic verification of the satisfiability of sets of statements expressing various kinds of knowledge or specifications. They may also provide help for management of unsatisfiable sets of statements through computation of maximal satisfiable subsets. They may also provide tools to analyze logical dependencies between formulas and help minimize logical knowledge bases through computation of minimal unsatisfiable subsets.

Building and/or exploitation environments for knowledge based systems: they may incorporate more or less implicitly truth maintenance functionalities, and may also use automated proving to answer queries and draw conclusions from knowledge bases in exploitation mode.

Database management and exploitation systems: as environments for knowledge based systems, they may incorporate more or less implicitly truth maintenance functionalities in order to verify database conceptual schemas, and may also, in exploitation mode, use automated proving to answer queries about deductive databases.

Domain-oriented specific applications using implicitly or explicitly first-order logic automated reasoning, like, for example, fault-finding, diagnosis, maintenance, reliability analysis, prevision systems, etc, in various domains like, for example, technical, medical, financial, etc.

Methodological tools for the conception of information systems: conceptual schemas of information systems for enterprises and administrations of various scales can be translated into logic, and then formally checked with automated reasoning.

Software libraries (sources and/or object codes) or hardware co-processors which can be sold or distributed as stand-alone products or in packages, providing routines related to automated reasoning.

Formal verification and symbolic simulation of the specifications of dynamical devices or systems. When parts or totality of the specifications, at some level of discrete abstraction for continuous physical systems, can be expressed or translated in logic, various verifications of properties fulfillment can be performed by automated reasoning. In case of violation of some required properties, truth maintenance functionalities may be used to restore correctness. Automated reasoning may also be used to simulate in more or less instantiated context the behavior of the specified device or system. In this class of applications there are, for example:

formal verification and symbolic simulation of the specifications of various finite state machines: for example digital circuits, man/machine interfaces, etc.

formal verification and symbolic simulation of program specifications.

formal verification and symbolic simulation of the specifications of concurrent systems.

formal verification and symbolic simulation of the specifications of communication protocols.

formal verification and symbolic simulation of the specifications of complex systems, e.g. nuclear reactors, emergency plans, etc.

etc.

Formal verification, formal comparison to specifications and symbolic simulation of the description of real devices or systems. As with formal verification of specifications, except that there it is some logical description of real devices or systems which is of concern. Moreover, if specifications are available, the conformity of a real: system to its specifications can be checked by automated reasoning. In this class of applications there are, for example:

formal verification and symbolic simulation of various finite state machines: for example digital circuits, man/machine interfaces, etc.

formal verification and symbolic simulation of programs.

formal verification and symbolic simulation of concurrent systems.

formal verification and symbolic simulation of communication protocols.

formal verification and symbolic simulation of complex systems, e.g. nuclear reactors, emergency plans, etc.

etc.

Security analysis of programs, information and decision flowcharts.

BACKGROUND OF THE INVENTION

Currently available proof methods for first-order logic have a common drawback. They cannot provide simultaneously a level of performance and a degree of robustness sufficient to fulfill industrial needs.

Currently available proof methods rely on some common basic principles which give them a great propensity to waste time in performing redundant operations, except when by chance they quickly find a proof. As a consequence they have a great lack of robustness: robustness means here completeness and soundness plus regularity of performance on problems of similar complexity and also boundedness for most solvable problems. In order to be more robust, these proof methods have to be augmented with curative strategies which do not prevent them from performing redundant operations but just delete some of the unneeded results that they record. These curative strategies are rather time an space consuming while, however, they do not always bring enough robustness. On the other hand, among the available proof methods the only one which may reach a significant level of performances for industrial purpose are those inspired by the interpretation and compilation methods currently used for Horn clause logic programming languages like PROLOG, methods which can be extended to cope with unrestricted first-order logic (see for example: "Computing with Logic", Benjamin/Cummings 1988, Maier, D. and Warren, S.). Good performance is obtained at the price of a complete lack of robustness, which makes this kind of approach rather useless except in the particular context of programming languages intended to be used by careful and skilled programmers.

A detailed analysis of this common drawback is now discussed. Note that the notions which are of current use in automated proving literature are all precisely defined in the bibliographical references mentioned below. Most of these notions (e.g. clause, literal, most general unifier, substitution, etc) will be used here without any recall of their definition. However, it may be referred to the preliminary recalls presented as an introduction of the description of the present method. The first mention of any notion which is new or not of current use in automated proving literature will be marked by the use of italic letters. Italic letters will be also used when introducing a notion with a definition differing from the definition which can be found in the bibliographical references.

Available proof methods for full first-order logic are refutation deduction systems of which aim is to deduce a contradiction, i.e. a formula which is obviously unsatisfiable, from unsatisfiable formula sets. A refutation deduction system can be algorithmically defined as being a loop of which exit condition is the presence in the current formula set of a contradiction or the impossibility to apply its deduction rules to the current formula set in order to perform a new deduction step. At each iteration of this loop is chosen a particular deduction step among all those which can be performed. This selected deduction step is then executed, the resulting formula being added to the current formula set. Note that theorem proving can be achieved by refutation deduction systems thanks to the following property: a formula is a theorem for a set of proper axioms if and only if this set of axioms when augmented with the negation of the formula becomes unsatisfiable.

Most of these proof methods use deduction rules which are refinements or slight modifications of Robinsons resolution principle on formulas in clausal form. Theoretical and practical issues of such resolution-based proof methods are comprehensively documented in many classical textbooks (for example, see: Symbolic Logic and Mechanical Theorem Proving Academic Press 1973, Chang, C. L. and Lee, R. C. T., or An Introduction on Automated Deduction by Stickel, M., E. in Fundamentals of Artificial Intelligence p. 75–35 133, Springer-Verlag 1986).

The source of the propensity of currently available proof methods to perform redundant operations relies in their deductive nature. A deduced formula is, by definition, always logically redundant with the initial formula set from which it is deduced: it just duplicates and combines pieces of logical information already expressed separately in the initial formula set. A contradiction is produced when two directly uncompatible pieces of information are combined together. Thus, refutation deduction systems while duplicating pieces of informations have generally growing chances to perform recombinations of already combined pieces of information.

A refutation proof is a sequence of deduction steps leading from the initial formula set to a contradiction and where all deduction steps are needed to deduce this contradiction. A deduction step will be said intrinsically useless for proof purpose when it cannot occur in any refutation proof. A deduction step will be said redundant for refutation purpose when, if occurring in some proofs, already performed deduction steps could replace it to build similar proofs. In other words a deduction step is redundant when it does not produce a formula closer to a contradiction than already available ones.

A refutation method is said complete when for any unsatisfiable formula set it is guaranteed to always find a refutation proof after a finite number of steps. A proof method is said bounded on a class of solvable problems when it is guaranteed to reach a decision after a finite number of deduction steps for any problem of this class:

when a proof method is bounded on a class of problems it is a decision procedure on this class. For most satisfiable formula sets, the number of possible deduction steps is a priori not finite. Thus boundedness on such problems relies exclusively on skill in discarding intrinsically useless and redundant deduction steps. For a given proof method the apparent complexity of a problem is related to the number of deduction steps that it would pave to perform with a breadth-first search strategy before to reach a conclusion. But the real complexity of a problem is rather related to the number of deduction steps that would have to be performed to reach a conclusion if all intrinsically useless or redundant deduction step were preventively discarded. So two problems of similar real complexity may appear to be of quite different complexity to methods which do not discard enough redundant and useless deduction steps. Thus regularity of performances relies, like boundedness, essentially on skill in avoiding useless or redundant deduction steps.

Resolution-based methods can use two kinds of deletion strategies to become more robust: preventive deletion strategies and curative ones. Tautologies and clauses with a pure literal can be deleted from the current clause set because any resolution step involving such clauses would be intrinsically useless. The deletion strategy eliminating clauses with a pure literal is called purity. Tautology elimination and purity elimination are preventive strategies avoiding the execution of intrinsically useless deduction steps. Deletion of subsumed clauses is a strategy called subsumption. Subsumption is a curative strategy. It provides a means to discard the effects of the most obviously redundant deduction steps after they have been performed: it does not prevent their execution.

Subsumption requires, each time a new clause is produced, to compare it with the ones already present in the clause set. This is time consuming. However, even with subsumption, resolution remains unbounded for simple problems of the Bernays-Schönfinkel class, i.e. the class of problems expressed by clauses without functional terms. This is quite surprising as problems of this class have always a finite Herbrand Universe. This illustrates well that subsumption does not detect all the undesirable effects of redundant deduction steps and thus cannot bring, despite its computational cost, enough robustness to resolution.

Basic resolution, also called binary resolution, can be refined in order to consider more than one link at one and the same time. This refinement is called hyperresolution. Each hyperresolution step does the deductive job of several binary resolution steps, and there are less possible deduction steps than with binary resolution. However, if hyperresolution leads to perform less deduction steps than binary resolution, it shows still a great propensity to perform redundant deduction steps.

Resolution, hyperresolution and subsumption have all been invented in the same year, 1965, by J. Robinson. Since this time, most of research works in the field of automated proving have been devoted to ameliorate the performances of binary resolution and hyperresolution deduction systems, mainly through the addition of various restriction strategies: i.e. strategies which, at each iteration of the loop, forbid to consider as possible candidates for execution the deduction steps which are not in some restricted subset of the complete set of all the possible ones. Like the replacement of binary resolution by hyperresolution, these restriction strategies may provide better performances but none of them can both preserve completeness and correct sufficiently the propensity of deduction systems to perform redundant operations.

To find satisfying solutions to this common drawback of resolution deduction systems, from the above constatations, it seems required to move away from Robinson's principles. Since 1965 until now there have been only three proposals which go in this direction. The first one, Kowalski's link removal in clause graph resolution, starts with classical Robinsons resolution but adds a means to discard certain links before they can be used: the resulting system is no longer a classical resolution deduction system, and this brings often a very significant enhancement over Robinson's deductive approach while this also may lead sometimes to unacceptable flaws of behavior. The two other proposals, are relying on classical deduction systems but replace resolution by other deduction rules.

Now Kowalski's link removal will be considered. Resolution applies on links between complementary literals occurring in different clauses of the clause set. A preventive strategy would eliminate redundant links before they are resolved. This would require to understand why a link may be a priori redundant, which is a question never considered by curative strategies like subsumption. Another benefit would be that eliminating redundant links before they are resolved leads to much more pure literals in consequence purity may then eliminate much more clauses.

This idea is the basis of clause graph resolution, in short cg-resolution, introduced by R. Kowalski in 1975 (for example, see: "Properties of Clause Graph Resolution", Morgan Kaufman Publishers 1991, Eisinger N.). Instead of clause sets it operates on clause graphs, where vertices are individual clauses and the edges are links between clauses. Clause graph resolution links contribute to the logical meaning as well as clauses. This allows to remove some redundancy of logical information by removing links instead of clauses. On the other hand it is needed to compute and store all the possible links between clauses, which may be time and space consuming. Links of derived clauses are not directly computed but rather inherited from their parent clauses. When two clauses are resolved upon a link, this link is removed from the set of available links. Then, this removed link cannot be inherited by new clauses which could be derived afterwards. This particular deletion strategy of cg-resolution is called link removal: it does not eliminate clauses but discard links. Note that without link removal, cg-resolution would behave exactly like standard resolution. Thanks to link removal, derived clauses may have much less links with other clauses in cg-resolution than in standard resolution and thus much less deduction steps are allowed. This, in combination with purity, often leads to very significant pruning of the search space and proportional gains in performances over standard resolution.

However, cg-resolution can run forever without reaching any decision on some satisfiable sets of ground clauses: cg-resolution is unbounded on the ground level which is not the case of standard resolution augmented with subsumption. The reason for this first flaw is that link removal does not preventively discard enough of the redundant links that standard resolution would have considered, while it makes things much too complicated to use subsumption in complement, as freely as needed. A second flaw of cg-resolution is that link removal may also prevent the consideration of some links which are not redundant: in such a case cg-resolution may run forever or conclude erroneously that the initial clause set is satisfiable while it is in fact unsatisfiable. This last flaw is related to the fact that cg-resolution is not a classical deduction system: link removal may have as effect that after a resolution step the resulting clause graph: is not logically equivalent to its previous state, and thus clauses which were deductible from this previous state may become non deductible after a resolution step. The flaw occurs when among the clauses which become non deductible is the empty clause that resolution is intended to produce.

These two flaws show that link removal is lacking a sound theoretical foundation. Link removal is not relying on a deep understanding of the reasons why a link could be redundant: it is rather a tricky strategy which gives often very good results while, sometimes, unacceptable behaviors may result from it. However, since 1975 until now, no other idea has been published to prevent redundant deduction steps by discarding preventively redundant links. It may be suspected from this constatation that a strong and safe preventive avoidance of redundant deduction steps may well be impossible in the context of resolution-based proof methods.

We now examine non resolution-based proposals which move away from Robinson's principles by replacing resolution or hyperresolution by alternative deduction rules.

A first direction to move away from resolution and hyperresolution deduction rules is illustrated by Bibel's connection method (see: "Automated theorem proving", Vieweg 1987, Bibel W.).

A path of a clause set is any list of literals such that each element of this list occurs in a different clause. A path is said complete when its length is the cardinal of the clause set. A connection is any pair of opposite literals. The leading principle of Bibel's connection method is the following for the propositional ground level. To refute a clause set it is sufficient to compute the set of its complete paths which do not include a connection: if this set is empty the initial clause set is refuted otherwise it is proved satisfiable. This method can be viewed as a deduction system relying on the following deduction rule that we shall name superclausal conjunction: from two formulas in disjunctive normal form derive their logical conjunction expressed also in disjunctive normal form. It is assumed there that the rewriting under disjunctive normal form always removes all the conjunctions of literals when two opposite literals occur: this comes just to discard paths including a connection. Below we shall call superclause any quantifier-free formula in disjunctive normal form. As a clauses is a disjunction of literals, a superclause is a disjunction of what we call superliterals, a superliteral being itself a conjunction of literals. The notion of superclause generalizes the usual notion of clause as clauses are just superclauses with every superliteral being a single literal. Then the superliterals of a superclause resulting of the logical conjunction of several different clauses are just the conjunctive expression of the connection-free complete paths of the set of these clauses. Clauses are often presented as lists or sets of literals, their disjunctive nature being left implicit. Superclauses can in the same way be represented as (disjunctive) sets of (conjunctive) sets of literals. In this case superliterals are sets resulting of a simplification of paths (elimination of duplicate literals and reduction to the empty set when a connection is included). To get a complete refutation system it is sufficient to apply the superclausal conjunction rules on superclauses which have a connection, i.e. one of the superliterals of their superclausal conjunction will be reduced to the empty superliteral because of the occurrence of two opposite literals.

The parent superclauses involved in a superclausal conjunction step can be safely removed as soon as the superclause resulting of their conjunction is generated. Thus superclausal conjunction is not a simple deduction rule but rather a transformation rule on superclause sets which safely removes parent superclauses when it adds their derived child. Using such a kind of transformation rule has the nice property of avoiding the duplication of pieces of logical information inherent to the use of deduction rules.

However when climbing from the propositional ground level to the first-order level things become much more complicated and the good property obtained on the ground level is lost. At the first-order level there are not only connections but also links within complementary literals which can become opposite only after the application of a non empty most general unifier. In this case, the superclausal conjunction will compute the conjunction of strict instances of the parent clauses and then the parent clause cannot be removed without loosing completeness. Moreover a second deduction rule must be used in order to generate instances of superclauses resulting from the reduction of links internal to superliterals. Thus, at the first-order level, the connection method is faced with the same drawback as resolution, that it may even considerably amplify. As a consequence, the connection method to be both complete and of practical use, has to be refined: instead of dealing with superclauses through superclausal conjunction, it rather uses rules dedicated to the expansion and reduction of individual paths. But it then appears that with these kind of refinements the connection method becomes quite similar to a slight modification of resolution, known as model elimination procedure.

Thus Bibel's connection method as other methods which follow the same lines of inspiration, while quite different from resolution in their conceptual principle, do not open in practice really new ways to build efficient and robust proof methods.

Now we examine a second alternative to resolution, which can be illustrated by a method recently proposed in 1992 by Lee and Plaisted.

A superficial examination of resolution would conclude that it is a very simple deduction rule and that it would be useless to seek alternative rules to base on proof methods. The disappointing collapse of the connection method, when refined to be of practical use, to a well-known kind of resolution seems also in favor of such a conclusion. But a deeper examination shows that resolution is indeed much more complicated than it seems to be. It can be analyzed as the intricate mix of two more basic operations: ground resolution and another operation that we shall call here link: instance generation. Link instance generation is a deduction rule which derives instances of a pair of clauses by applying to them a most general unifier related to one of their common links. Ground resolution is a deduction rule which operates on the propositional ground level. A refutation deduction system using only ground resolution is sound and complete for propositional logic. Moreover, augmented with subsumption, ground resolution is bounded on propositional logic and thus the combination of ground resolution with subsumption provides a decision procedure for propositional logic. In order to cope with logical variables of the first-order level, ground resolution is mixed with link instance generation which is only concerned with first-order specific features. The result is the standard resolution rule for first-order logic, which can be further refined to become hyper-resolution. Then, as it has already been mentioned, the combination of resolution with subsumption is unbounded for some almost propositional problems which would have to be very easy to solve by any useful proof method. A conclusion which may be drawn from this is that mixing in an unique operation two more basic operations of different concerns, like ground resolution and link instance generation are, may well be an important source of difficulties that would not appear if these operations were kept separate.

This is the idea underlying a new proof method proposed by Lee and Plaisted in 1992 (in "Eliminating Duplication with the Hyper-Linking Strategy", Journal of Automated Reasoning 1992, Vol. 9, pages 25–43, Lee, S. J. and Plaisted, D. A.). In this method, contrarily to resolution, the obtention of a refutation is not due to an unique rule. There are in fact two independent submethods which are interacting: a deductive system using two kinds of instance generation rules, and a proof method dedicated to the propositional ground level. This last submethod dedicated to the propositional ground level is not based on ground resolution but on a more efficient approach inspired by Davis and Putnam algorithm (see, for example, Journal of the ACM, Vol. 7, 1960, pages 201–205 "A computing Procedure for Quantification Theory" Davis, M. and Putnam, H.). The deduction system uses a rule that Lee and Plaisted call hyper-link operation and which is a refinement of link instance generation similar to what hyperresolution is to binary resolution (in the related publication, Lee and Plaisted call link operation what we call here link instance generation, and hyper-link operation what we shall call hyper-link instance generation). There is also a second instance generation rule which derives from each non ground clause a ground instance obtained by replacing any variable by a same constant. We shall call this particular instance generation rule a ground instance generation. In their publication Lee and Plaisted prove that a deduction system using only link or hyper-link instance generation and ground instance generation, when augmented by any sound and complete proof method for propositional logic, is then sound and complete for first-order logic: Moreover they show that, on a class of problems that they call near-propositional problems, their method can provide much better performances than resolution or hyperresolution.

In this approach proposed by Lee and Plaisted, the deduction system which iteratively applies instance generation rules, as it is a deduction system, shows a great propensity to perform redundant deduction steps. While it is not mentioned in the related publication, the deletion strategies already employed by resolution-based methods can be adapted to instance generation systems, e.g., purity, subsumption or link removal. But there subsumption cannot be entirely applied as with instance generation any derived clause is subsumed by its parent clause. It is only a simplified kind of subsumption which can be used: elimination of variant clauses.

A clause generated by instance generation is subsumed by its parent clause from which it is drawn. Contrary to what happens in resolution, subsumed clauses cannot be removed as this would lead to discard any generated clause: two variant clauses are completely redundant for refutation purpose because their respective child clauses generated by ground instance generation would be identical.

Note that an instance generation system when augmented with elimination of variant clauses is obviously bounded on the Bernays-Schönfinkel class of problems. However, Lee and Plaisted remark that detecting and eliminating duplicate clauses, which is a simplified kind of variant elimination, is yet quite time consuming for their method and they cite as a possible alternative link removal on clause graphs. Link removal can be adapted to link instance generation on clause graphs: each time a link instance generation is performed upon a link, the link can be removed from the parent clauses. But, as already seen, with link removal the boundedness property which is obtained for some interesting class of solvable problems may well be easily lost. This was the first flaw of link removal in cg-resolution which remains true for instance generation systems: link removal does not discard enough redundant links while it makes things too complicated to apply freely a complementary curative strategy like elimination of variant clauses. However, the second flaw of link removal in cg-resolution, the possibility that some clause may become non deductible while it was previously deductible from the initial clause graph, cannot happen when link removal is applied to instance generation systems: for such systems link removal just prevents redundant deduction steps to be performed and it does not delete any non redundant information.

As it is proposed, the method of Lee and Plaisted seems of little interest for problems which are far from being of the near-propositional kind. With resolution, the literals of the parent clauses which are involved in a link are discarded from the resolvent clause while these literals are still present in the derived clauses with link instance generation rule. And in cases where functional terms play an important role and where possible proofs may be of a non neglectable minimal length, this may lead to perform much more redundant deduction steps than with resolution.

In conclusion, as Lee and Plaisted do not propose or even suggest in their publication any new strategy to prevent redundant instance generations. Their particular proof method is not of a greater practical interest, and in fact it is of a much lower pratical interest, than resolution-based ones, except when dealing with near-propositional problems.

Proof methods which, like Lee and Plaisted's method, keep separate instance generation rules and propositional ground level operations will be called instance generation methods.

More generally, the background of the present invention can also be found in the following documents:

Andrews, P. B., Refutations by matings, IEEE Transactions on Computers, Vol. C-25 (1976), pages 801–806;

Andrews, P. B., Theorem Proving via General Matings, Journal of the ACM,.Vol. 28 (1981), pages 193–214;

Billon, J. P., Perfect Normal Forms for Discrete Functions, Bull research report (June 1987);

Billon, J. P. and Madre J. C., Original concepts of PRIAM, an Industrial Tool for Efficient Formal Verification of Combinatorial Circuits, in The Fusion of Hardware Design and Verification, G. J. Milne editor, North-Holland publishers (1988);

Bryant, R. E., Graph-based Algorithms for Boolean Functions Manipulations, IEEE transactions on Computers, Vol. C35 (1986), pages 677–691;

Bryant, R. E., Symbolic Boolean Manipulation with Ordered Binary-Decision Diagrams, ACM Computing Surveys, Vol. 24 (1992), pages 293–318;

Eisinger, N., Completeness, Confluence and Related Properties of Clause Graph Resolution, Pitman (1991);

Joyner, W. H., Resolution Strategies as Decision Procedures, Journal of the ACM, 23 (1976), pages 398–417;

Kowalski, R. and Kuehner, D., Linear Resolution with Selection Function, Artificial Intelligence, Vol. 2 (1971), pages 227–260;

Kowalski, R., A Proof Procedure Using Connection Graphs, Journal of the ACM, Vol. 22 (1975), pages 572–595;

Kowalski, R., Logic for Problem Solving, Elsevier (1979);

Loveland, D. W., A Simplified Format for the Model Elimination Procedure, Journal of the ACM, Vol. 16 (1969), pages349–363;

Loveland, D. W., Automated Theorem Proving a Logical Basis, North Holland (1978);

Letz, R., Schumann, J., Bayerl, S. and Bibel, W., SETHEO "A High-Performance Theorem Prover", Journal of Automated Reasoning, Vol. 8 (1992), pages 183–212;

Madre, J. C, Coudert, O., Billan, J. P. and Berthet, C., Formal Verification of Digital Circuits Using a Propositional Theorem Prover, Proceedings of the IFIP Working Conference on the CAD Systems Using AI Technics, Tokyo (1989);

Robinson, J. A., a Machine-oriented Logic based on the Resolution Principle, Journal of the ACM, Vol. 12 (1965), pages 23–41;

Robinson, J. A., Logic Form and Function, Edinburgh University Press (1979):;

Shostak, R., Refutation Graphs, Artificial Intelligence, Vol. 7 (1976), pages 51–64;

Smullyan, R. M., First-order Logic, Springer, Berlin (1968).

SUMMARY OF THE INVENTION

The invention relates to a new proof method for unrestricted first-order logic, providing simultaneously a level of performance and a degree of robustness that could not be provided by any currently available proof method and can be sufficient to fulfill industrial needs.

The invention relates to a method of automated proving for unrestricted first-logic to test the satisfiability of clause sets describing an industrial system, comprising applying the instance generation rule $$(IG) \quad \frac{\Psi}{\Psi\sigma}$$

where $\Psi$ is a term, $\sigma$ a substitution and $\Psi\sigma$ an instance of $\Psi$ yielded by the substitution $\sigma$, characterized in that, defining an instance subtraction as the subtraction of the instance $\Psi\sigma$ from $\Psi$ resulting in a generalized term which is a triplet $<\Psi, \sigma, \Lambda>$ where $\Lambda$ is a finite set of standard substitutions $\{\lambda_1, \ldots, \lambda_n\}$ and defined by $$GE(<\Psi, \sigma, \Lambda>) = GE(\Psi\sigma) - GE(\{\Psi\lambda_1, \ldots, \Psi\lambda_n\})$$

the method further applies an instance subtraction combined with said instance generation rule to get an instance extraction rule defined by $$(IE) \Sigma \rightarrow (\Sigma - \{\Psi<\sigma, \Lambda>\}) \cup \{\Psi<\sigma\mu, \Lambda^*\sigma\mu>, \Psi<\sigma, \Lambda\cup\{\sigma\mu\}>)$$

where $\Sigma$ is a set of clauses and $\mu$ is a substitution valid for the generalized term $\Psi<\sigma, \Lambda>$, whereby the set $\Sigma$ can be proved unsatisfiable.

Optionally, when defining a half-unifier of the term $\Psi$ for a term $\Phi$ as a substitution $\sigma$ such that the instance $\Psi\sigma$ is an instance of $\Phi$, and a most general half-unifier as a half-unifier yielding a most general instance, the instance extraction comprises a link instance generation modified to become a half-link generation rule defined by $$(HIG) \quad \frac{\Psi, \Phi}{\Psi\sigma1, \Phi\sigma2}$$

where $\sigma1$ and $\sigma2$ are two complementary most general half-unifiers of the literals of a link between $\Psi$ and $\Phi$.

A list or a set of superliterals which are themselves a list or a set of literals being called a superclause, the method further comprises translating clauses into superclausal formalism and applying an instance generation on superclause sets.

Thus, an Extract-Minimal-Half function can be computed from an algorithm defined as Extract-Minimal-Half(mgu, tag):
  Let Res be a copy of mgu where all variables tagged by tag are replaced by untagged variables of same name
  Remove from Res all unit substitutions on tagged variables;
  % minimization loop %
  Forall unit substitution u in Res do:
    When the right side of u is a tagged variable replace in Res all occurrences of this variable by the left side of u and remove u from Res;
  Replace remaining tagged variables in Res by new untagged variables;
  Return Res;

Additionally, in defining a near-quasi-connection when its related most general unifiers and most general half-unifiers contain only unit substitutions which associate variables to variables, the method can use the property that the ground set corresponding via ground instance generation to a clause or superclause set has a complete spanning set of connections if and only if this last set has a complete spanning of near-quasi-connections, so that a ground instance generation can be avoided.

The method can also apply a purity elimination strategy, the purity being defined in superclausal formalism when a superliteral is pure, i.e., if it has neither external link nor internal link and/or a tautology elimination strategy and/or a unit-reduction.

Furthermore, the method can use hyper-half-links, a hyper-half-link of a clause being a list of half-links of the clause or superclause such that there is in this list one and only one half-link of each of the literals of the clause or each of the superliterals of the superclause, so that a hyper-half-link generation complies with the rule $$(HHIG) \quad \frac{\Psi}{\Psi\theta}$$

where $\theta$ is the substitution associated to a valid hyper-half-link of $\Psi$.

In this case, a generalized superclause being said hyper-pure when it has; no valid hyper-half-link, the hyper-half-link generation can further comprise a superpurity elimination strategy of eliminating hyperpure superclauses instead of a purity elimination strategy.

It will be shown that the invention relates to four innovative enhancements which can be done to a family of proof methods for first-order logic that we call instance generation methods. Each of the four enhancements preserves the completeness and the combination with one another also preserves the completeness.

The invention further relates to the automated proving tool carrying out the method of the invention and the industrial system resulting from the application of this method it also relates to an information carrier, such as a magnetic tape or disk, incorporating a program carrying out the method of the invention.

DESCRIPTION OF THE PREFERRED EMBODIMENT

This description will be illustrated with algorithms given as examples to carry out the method.

At first, preliminary recalls will be presented. Below we shall use the following notations and definitions which are rather usual in automated proving field (see previous bibliographical references):

A term is a symbolic expression where occur two kinds of symbols: the constant symbols and the substitutable variables. By extension, any list of terms will be considered as being also terms. Quantifier-free formulas, superclauses, clauses, literals, predicate arguments are examples of terms.

The set of substitutable variables occurring in a term (clause, superclause, literal, etc) is called the domain of this term. A term, is said to be ground when its domain is empty. The set GE($\Psi$) of all the possible ground instances of a term $\Psi$ is called its ground expansion. When terms are expressing quantifier-free formulas, superclauses, clauses or literals, their ground expansion is rather called Herbrand expansion.

A substitution is represented by a set $\{x_1 \to t_1, \ldots, x_n \to t_n\}$ of unit substitutions $x_i \to t_i$, where $x_i$ is a variable and $t_i$ a term. The set of variables $\{x_1, \ldots, x_n\}$ occurring in the left sides of the unit substitutions is called the domain of the substitution. The set of variables occurring in the right sides is called the codomain of the substitution. The domain and codomain of a substitution are assumed to be finite and disjoint.

$\Psi$ being a term, $\sigma$ a substitution, $\Psi\sigma$ will stand for the instance resulting of the application of $\sigma$ on $\Psi$.

$\sigma$ and $\mu$ being two substitutions, $\sigma\mu$ will stand for the composition of $\mu$ with $\sigma$: $\Psi\sigma\mu = (\Psi\sigma)\mu$.

$\epsilon$ swill stand for the empty substitution: for any $\Psi$, $\Psi\epsilon = \Psi$.

$\perp$ will stand both for the impossible substitution and the impossible term: for any $\Psi$, $\Psi\perp = \perp$. Note that GE($\perp$)=Ø

$\Psi$ is said to be: an instance of $\Phi$ when there is a substitution $\sigma$ such that: $\Phi\sigma = \Psi$. Then $\Phi$ is said to to be more general or also to subsume $\Psi$.

A substitution $\sigma$ is said to be an instance of a substitution $\mu$ when for any term $\Psi$, $\Psi\sigma$ is an instance of $\Psi\mu$. Then $\mu$ is said more general or also to subsume $\sigma$.

Two terms or substitutions are said to be variants when each of them is an instance of the other. In the sequel, $\Psi \equiv \Phi$ will mean that $\Psi$ and $\Phi$ are variants. When for any $\Psi$, $\Psi \equiv \Psi\sigma$, the substitution $\sigma$ is called a renaming. Note that $\Psi \equiv \Phi$ if and only if GE($\Psi$)=GE($\Phi$).

Two terms are said to be standardized apart when their domains are disjoint. In the sequel the expression Standardize($\Psi$) will stand for a term, resulting of some renaming of the variables of R, assumed to have no variable in common with any other term previously considered.

A substitution $\gamma$ is called an unifier of $\Psi$ and $\Phi$ when $\Psi\gamma = \Phi\gamma$. $\Psi$ and $\Phi$ are said unifiable when they have an unifier different of $\perp$. When two terms are unifiable there always exists an unifier which subsumes all the other unifiers of these, terms: it is called a most general unifier, in short mgu. There are several well-known algorithms to compute an mgu. In the sequel we shall assume that the mgu of two terms has in its codomain only variables already belonging to the domains of these terms.

$\sigma$ and $\mu$ being two substitutions, $\sigma*\mu$ stands for the substitution resulting of the combination of $\sigma$ and $\mu$, i.e., $\sigma*\mu$ is a most general substitution being common instance of $\sigma$ and $\mu$. Then, $\Delta$ being the union of the domains of $\sigma$ and $\mu$, $\sigma*\mu$ is an mgu of $\Delta\sigma$ and $\Delta\mu$. Note that here it is assumed that the codomains of $\sigma$ and $\mu$ are both disjoint with $\Delta$. When $\sigma*\mu = \perp$ the substitutions $\sigma$ and $\mu$ are said incompatible.

a literal is a doublet of the type <sign, unsigned atom>, where unsigned atom is a term expressing a quantifier-free atomic formula and sign is the positive or negative sign. When its sign is negative a literal is interpreted as representing the negation of its unsigned part. A clause is a list of literals, intended to represent an unordered set of literals itself usually interpreted from the logical viewpoint as meaning the logical disjunction of its literals. The empty clause is then logically interpreted as a contradiction. A clause with two opposite literals is a tautological clause. There are well-known algorithms which can transform any finite sets of quantified, first-order logic formulas into refutationally equivalent sets of quantifier-free formulas, and then into equivalent sets of clauses.

Two literals $\psi$ and $\phi$ are said to be opposite when they have opposed signs and when their unsigned parts are equal $:|\Psi|=|\phi|:$ Two literals $\psi$ and $\phi$ are said to be complementary when they have opposed signs and when their unsigned parts are unifiable.

A link is a quintuplet $<\Psi,\psi,\Phi,\phi,\gamma>$ where $\psi$ is a literal of the clause $\Psi$, $\phi$ a literal of the clause $\Phi$, such that $\psi$ and $\phi$ are complementary and $\gamma$ is an mgu of $|\Psi|$ and $|\phi|$.

The general algorithm of instance generation methods in the clausal case will be considered. We shall give here a presentation of instance generation methods on clause sets through schematic algorithms. Such a general presentation cannot be found in the literature.

An instance generation rule is a deduction rule of the form:

$$(IG) \quad \frac{\Psi}{\Psi\sigma}$$

where $\Psi$ is an expression and $\sigma$ a substitution. Instance generation methods are using two rules of this kind: link instance generation and ground instance generation.

Link instance generation is the following deduction rule:

$$(LIG) \quad \frac{\Psi, \Phi}{\text{Standardize}(\Psi\gamma), \text{Standardize}(\Phi\gamma)}$$

where $\Psi$ and $\Phi$ are two different clauses, assumed to be standardized apart, which have a link between them and where $\gamma$ is an mgu related to this link.

Ground instance generation is the following rule:

$$(GIG) \quad \frac{\Psi}{\Psi_{gr}}$$

where $\Psi$ is a clause and $\Psi_{gr}$ its ground instance obtained by replacing any variable by a same fixed constant.

Instance generation methods work on two clause sets: the normal clause set, here denoted by NCS, and the ground clause set, here denoted by GCS. Note that these two clause sets may have common elements. Then can be given the following schematic algorithm in some pseudo algorithmic language. Lines of the form % . . . % are comments.

Instance Generation General Method for clause sets:
  % preparation phase %
  Let ICS be the input clause set
  Let GCS=Ø
  Let NCS=Ø
  Forall $\Psi$ in ICS do: Add $\Psi_{gr}$ to GCS;

Forall $\Psi$ T in ICS do: Add Standardize ($\Psi$) to NCS;
Main-Loop:
  % refutation decision %
  If there is a link between two unit clauses of NCS then goto End1;
  If GCS is unsatisfiable on the ground level then goto End1;
  % satisfiability determined by exhaustion of all possible operations %
  If there is no unmarked link between clauses of NCS then goto End2;
  % selection phase %
  Select an unmarked link between two clauses of NCS:

$L = <\Psi, \psi, \Phi, \phi, \gamma>;$

% link instance generation step %
  Add $\Psi$=Standardize ($\Psi\gamma$) and $\Phi$=Standardize ($\Phi\gamma$) to NCS;
  % used links are marked in order to not be considered twice %
  Mark L;
  % ground instance generation %
  Add $\Psi_{gr}$ and $\Phi_{gr}$ to GCS;
  Goto Main-Loop;
  End1: Print the input clause set is refuted; end.
  End2: Print the input clause set is satisfiable;
end.

Several comments have to be added about this schematic algorithm:

- It is not specified how the unsatisfiability of the set of ground clauses GCS can be proved as any known complete proof method for the propositional ground level can be used: e.g. ground resolution, Davis and Putnam method, ground connection method, rewriting into some canonical form, etc.
- Elimination of duplicate clauses and of variant clauses, as well as elimination of tautological clauses, may be performed when adding a clause to one of the clause sets. New links can also be exhaustively computed when adding a clause, directly or through clause graph machinery. Then purity can be applied. But links can also be, may be non exhaustively, computed only when needed during the selection phase.
- If a clause graph machinery is used to compute the links of derived clauses through inheritance, then, instead of being simply marked, used links can be removed from the clause graph. In this case one gets the direct adaptation of Kowalski's link removal in the context of instance generation methods.
- Various selection strategies (search strategies and restriction strategies) can be implemented through specific algorithms achieving the selection of an unmarked link at each iteration of the main loop.
- Instance generation methods following the above schematic algorithm are sound and complete proof methods for first-order logic when they use a fair strategy for link selection. This is rigorously established in the already cited publication of Lee and Plaisted. These authors have also introduced two enhancements: the use of hyper-link instance generation rule instead of link instance generation rule and the additional use of unit-reduction replacement rule. Using hyper-link instance generation instead of link instance generation does not change the schematic algorithm except that hyper-links have to be considered instead of simple links. The additional use of unit reduction requires a slight modification.

Let $\Sigma$ be the current clause set and $<\Psi, \psi, \Phi, \phi, \gamma>$ a link between two clauses of $\Sigma$ such that $\Phi$ is a unit clause, i.e. a clause with only one literal, and $|\Psi|$ is an instance of $|\phi|$. Unit reduction removes $\Psi$ from $\Sigma$ and replaces it by the reduced clause: $\Psi - \{\psi\}$. Thus unit reduction can be defined as the following transformation:

$(UR)\Sigma \rightarrow \Sigma - \{\Psi\} \cup \{\Psi - \{\psi\}\}$

With unit reduction the main loop of instance generation general method has to be modified:

Main-Loop:
  % refutation decision %
  If there is a link between two unit clauses of NCS then goto End1;
  If GCS is unsatisfiable on the ground level then goto End1;
  % satisfiability determined by exhaustion of all possible operations %
  If there is no :unmarked link between clauses of NCS then goto End2;
  % new part inserted for unit reduction %
  % unit reduction has priority %
  if there is a clause $\Psi$ in NCS which can be reduced by unit reduction then
  Let $\Psi'$ be the reduced clause
  If $\Psi'$ is the empty clause then goto End1;
  Remove $\Psi$ from NCS;
  Add $\Psi'$ to NCS;
  Remove $\Psi_{gr}$ from GCS;
  Add $\Psi'_{gr}$ to GCS;
  Goto Main-Loop;
  % end of the insertion %
  % the sequel is executed only when no unit-reduction %
  % can be performed %
  % There are no other modifications %
  % link selection phase %
etc.

The addition of unit reduction preserves completeness and soundness while it allows instance generation methods to be faster in cases where this operation can play an important role: e.g. in Horn clause logic where the combination of link instance generation with unit reduction gives a complete method without any need of ground instance generation.

As an example we consider now how instance generation methods can refute the following clause set: $\{\{p(X)\}, \{-p(a),-p(b)\}\}$ where X is a variable. There, in two steps link instance generation will generate from $\{p(X)\}$ the new instance clauses: $\{p(a)\}$ and $\{p(b)\}$. The ground clause set will thus include the three clauses $\{-p(a),-p(b)\}$, $\{p(a)\}$ and $\{p(b)\}$, which makes it unsatisfiable. This refutation can also be achieved, by unit reduction: as $p(X)$ subsumes $p(a)$ and $p(b)$, in two unit reduction steps the clause $\{-p(a),-p(b)\}$ is reduced to the empty clause: note that in this case no instance generation is needed to achieve the refutation.

Instance Extraction General Method

When performing an instance generation step upon a term (clause, superclause, etc) $\gamma$ with a substitution a, the generated instance, $\Psi\sigma$, is added to the set of terms under consideration (clause set, superclause set, etc). The information that $\Psi\sigma$ To is intended to express is then duplicated as it is still inscribed in its parent $\Psi$. Thus the set $\{\Psi, \Psi\sigma\}$ expresses no more information than $\Psi$ alone. This redundancy can be completely avoided, at least from a syntactical viewpoint, thanks to an original operation that we name instance subtraction. Once an instance $\Psi\sigma$ of $\Psi$ has been generated, instance subtraction modifies the initial term $\Psi$ by subtracting the instance $\Psi\sigma$ from $\Psi$. The result yielded by this subtraction of $\Psi\sigma$ from $\Psi$, in brief $\Psi-\Psi\sigma$, is quite similar to the initial $\Psi$, with the only exception that $\Psi\sigma$ is no longer an instance of $\Psi-\Psi\sigma$ while any instance of $\Psi$ which is not an instance of $\Psi\sigma$ is still an instance of $\Psi-\Psi\sigma$. As a consequence, no piece of syntactical information which was initially inscribed in $\Psi$ can be duplicated in $\{\Psi\sigma, \Psi-\Psi\sigma\}$ while the initial information inscribed in $\Psi$ is exactly captured by the set $\{\Psi\sigma, \Psi-\Psi\sigma\}$.

An instance generation rule when augmented by instance subtraction becomes a new transformation rule on sets of terms, that we name an instance extraction rule and which can be formally defined by:

$$(IE) \Psi \epsilon \Sigma, \Sigma \rightarrow (\Sigma - \{\Psi\}) \cup \{\Psi\sigma, \Psi-\Psi\sigma\})$$

Replacing instance generation rules by instance extraction rules in instance generation methods leads to what we name instance extraction methods.

Modifying a term by instance subtraction leads to remove all the links of this term which were specific to the subtracted instance. It will be shown that thanks to instance subtraction more links are discarded in instance extraction methods than with Kowalski's link removal on clause graph in instance, generation methods. However instance subtraction is safe from the difficulties encountered by link removal because it is guaranteed not to prevent the generation of any clause which could be generated by a non redundant deduction step. It will be shown also that instance extraction is guaranteed to never generate two variant clauses among the direct or indirect descendants of a same clause.

The instance subtraction will be now discussed after the following denotational definition. Instance subtraction has a sound, deep and very simple theoretical basis which ensures that it provides effectively all the relevant effects that it is expected to provide and which excludes any unexpected effect which could have undesirable consequences. Moreover this theoretical basis leads directly to a practical algorithm. This is due to the fact that this theoretical basis has been elaborated in a particular manner: contrary to link removal in clause graphs, which was rather an operational trick of which denotational definition remains obscure, instance subtraction has been: drawn from a clear denotational definition based on the deep examination of the needs and which has lead afterwards, but quite directly, to operational issues.

A non ground term $\Psi$ can be interpreted as a schematic expression denoting the whole set of its possible ground instances: its ground, expansion $GE(\Psi)$. For this syntactical interpretation, the different atomic pieces of informations that are inscribed in a term are just its different ground instances. Then the redundancy among two instances $\Psi\sigma$ and $\Psi_\mu$ of a same more general term $\Psi$ can be measured by the set of their common ground instances:

$$GE(\Psi\sigma) \cap GE(\Psi\mu)$$

which is also the ground expansion of $Y(\sigma^*\mu)$.

The notion of ground expansion can be extended to cope with sets of terms when, as it is usual with formula sets in refutational methods, they can be interpreted as denoting the union of the respective ground expansion of each of their elements. This is achieved by the following definition: $GE(\{\Psi,\Phi\})=GE(\Psi)\cup GE(\Phi)$. From this definition it comes also that $GE(\Psi)=GE(\{\Psi\})$.

The expectation that the set $\{\Psi-\Psi\sigma, \Psi\sigma\}$ will capture exactly the syntactical information expressed by $\Psi$ alone, can then be directly reformulated as the requirement for $\Psi$ and $\{\Psi-\Psi\sigma,\Psi\sigma\}$ to denote the same ground expansion:

$$GE(\Psi)=GE(\Psi\sigma)\cup GE(\Psi-\Psi\sigma)$$

Note that here we do not yet know if $\Psi-\Psi\sigma$ can be a standard term. Thus $GE(\Psi-\Psi\sigma)$ has rather to be understood here as being the set of ground instances of the term $\Psi$ that $\Psi-\Psi\sigma$ is intended to denote than as being the set of the ground instances of $\Psi-\Psi\sigma$, which would be meaningless if $\Psi-\Psi\sigma$ was not a standard term.

The expectation that $\Psi$ and $\Psi-\Psi\sigma$ will not express common pieces of information is then directly expressed by a second requirement:

$$GE(\Psi\sigma) \cap GE(\Psi-\Psi\sigma)=\emptyset$$

From these two requirements results the following fundamental constraint that instance subtraction has to satisfy:

$$GE(\Psi-\Psi\sigma)=GE(\Psi)-GE(\Psi\sigma) \qquad (1)$$

Note that this expresses much more than just a particular constraint that instance subtraction would have to satisfy (1) is in fact a complete denotational definition of instance subtraction for the interpretation which maps terms onto sets of ground terms: what an instance subtraction on a term $\Psi$ denotes is then, an operator which maps $GE(\Psi)$ on some of its subsets. (1) provides also other information : what results from subtracting an instance from a standard term cannot be itself a standard term in most cases, because $GE(\Psi)-GE(\Psi\sigma)$ cannot be in general the whole set of the ground instances of a standard term. For example let $\Psi$ be $p(X,Y)$ and $\sigma$ be $\{X\rightarrow Y\}$. The ground expansion of $\Psi-\Psi\sigma$ will then contain ground terms like $p(a,b)$ and $p(b,a)$ which cannot be both instances, obtained through usual substitutions, of any other standard term than $p(X,Y)$ itself.

The situation is then that we have now a clear and complete denotational definition of instance subtraction but that we do not know yet what kind of process on what kind of symbolic data structure can receive such a denotation. The solution to this kind of problem can often be found in some algebraic morphism relating denoted functions and some internal operations on composite data structures.

Before any further step in this direction, it must be noted that instance subtraction is not the only operation to consider. The notion of substitution also has to be revisited in order to be of some use in processing terms modified by instance subtraction. It appears then that a substitution $\mu$ on a term $\Psi$ has the same kind of denotational definition than an instance subtraction. It denotes too an operator mapping $GE(\Psi)$ on some of its subsets: $GE(\Psi\mu)$. Thus if applying the substitution $\mu$ on the term $\Psi$ comes to compute the intersection of $GE(\Psi\mu)$ with $GE(\Psi)$, it is possible to extend the notion of substitution to cope with non standard terms like $\Psi-\Psi\sigma$ by defining the application of a substitution $\mu$ on $\Psi-\Psi\sigma$ as being denotationally equivalent to compute the intersection of $GE(\Psi-\Psi\sigma)$ with $GE(\Psi\mu)$. This is expressed by the following denotational definition:

$$GE((\Psi-\Psi\sigma)\mu)=GE(\Psi-\Psi\sigma) \cap GE(\Psi\mu) \qquad (2)$$

From (2) comes immediately the property:

$$GE((\Psi-\Psi\sigma)\mu)=GE(\Psi\mu)-GE(\Psi\sigma)=GE(\Psi\mu)-GE(\Psi\sigma^*\mu) \qquad (3)$$

Combining (1) with (2) leads to consistently extend the application of instance subtraction on terms already modified by previous applications of instance subtraction. This is ensured by the following two properties:

$$GE((\Psi-\Psi\sigma)-((\Psi-\Psi\sigma)\mu)=GE(\Psi)-GE(\{\Psi\sigma,\Psi\mu\}) \quad (4)$$

$$GE(((\Psi-\Psi\sigma)-((\Psi-\Psi\sigma)\mu)\theta)=GE(\Psi\theta)-GE(\{\Psi\sigma,\Psi\mu\}) \quad (5)$$

where (4) is proven by following sequence of equalities obtained by applying (1) then (2)

$$GE((\Psi-\Psi\sigma)-((\Psi-\Psi\sigma)\mu)=GE(\Psi-\Psi\sigma)-GE((\Psi-\Psi\sigma)\mu)=GE(\Psi)-GE(\Psi\sigma)-(GE(\Psi\mu)-GE(\Psi\sigma))=GE(\Psi)-(GE(\Psi\sigma)\cup GE(\Psi\mu))=GE(\Psi)-GE(\{\Psi\sigma,\Psi\mu\}).$$

Property (4) gives a law to perform repeated applications of instance subtraction on a same initial term. It proves moreover that subtracting instances from a same initial term is a commutative operation. Property (5) is proven by:

$$GE(((\Psi-\Psi\sigma)-((\Psi-\Psi\sigma)\mu)\theta) = GE((\Psi-\Psi\sigma)\theta)-GE((\Psi-\Psi\sigma)\mu) = GE(\Psi\theta-\Psi\sigma)-GE(\Psi\mu-\Psi\sigma) = GE(\Psi\theta)-GE(\Psi\sigma)\cup GE(\Psi\mu) = GE(\Psi\theta)-GE(\{\Psi\mu,\Psi\sigma\})$$

Property (5) extends directly property (2) on the result of repeated applications of instance subtraction on a same term.

The nice point is that instance subtraction and substitutions on a same term commute. Subtracting go from $\Psi\mu$ or selecting the subset of $GE(\Psi-\Psi\sigma)$ resulting of its intersection with $GE(\Psi-\Psi\sigma)$ yields the same set of ground terms as the set $GE(\Psi-\Psi\sigma)\cap GE(\Psi\mu)$ is equal to $(GE(\Psi)\cap GE(\Psi\mu)-GE(\Psi\sigma)$ which is equal to $GE(\Psi\mu)-GE(\Psi\sigma)$ and also to $GE(\Psi\mu)-GE(\Psi\sigma^*\mu)$. In other words, it comes that from the denotational viewpoint:

$$(\Psi-\Psi\sigma)\mu\equiv\Psi\mu-\Psi\sigma\equiv\Psi\mu-\Psi\mu^*\sigma$$

where here the variant relation$\equiv$ is used to mean equality of denotations.

Now to come into operational considerations we have to build an ad hoc algebraic structure and then a data structure to cope with instance subtraction. The point here is that this intended algebraic structure must be the transitive closure of some operation which can generalize both usual substitutions and instance subtraction.

From the consideration of definitions and properties (1) to (5) can be drawn immediately the following definition of what we call generalized terms:

A generalized term is a triplet $<\Psi, \sigma, \Lambda>$ where $\Psi$ is a standard term, $\sigma$ is a standard substitution and $\Lambda$ a finite set of standard substitutions: $\{\lambda_1, \ldots, \lambda_n\}$. The denotational definition of a generalized term $<\Psi, \sigma, \Lambda>$ is given by:

$$GE(<\Psi,\sigma,\Lambda>)=GE(\Psi\sigma)-GE(\{\Psi\lambda_1,\ldots,\Psi\lambda_n\}) \quad (6)$$

A standard term $\Psi\sigma$ is then denotationally equivalent to the generalized term $<\Psi, \sigma, \emptyset>$. The result of subtracting $\Psi\sigma$ from $\Psi$ is then denotationally equivalent to $<\Psi, \epsilon, \{\sigma\}>$.

One can also define what we name generalized substitutions:

A generalized substitution is a doublet $<\sigma, \Lambda>$ where $\sigma$ is a standard substitution and $\Lambda$ a finite set of standard substitutions: $\{\lambda_1, \ldots, \lambda_n\}$. A generalized substitution is an operator which maps standard terms onto generalized terms:

$$\Psi<\sigma,\Lambda>=<\Psi,\sigma,\Lambda> \quad (7)$$

The generalized substitution $<\sigma, \lambda>$ will be called the context of the generalized term $<\Psi, \sigma, \Lambda>$.

On generalized substitutions can be defined an internal law of composition that generalizes the usual combination of substitutions and which is denotationally defined by:

$$GE(\Psi(<\sigma,\Lambda>^*<\mu,\Pi>)=GE(\Psi<\sigma,\Lambda>)\cap GE(\Psi<\mu,\Pi>) \quad (8)$$

$$GE(\Psi<\sigma,\Lambda>)\cap GE(\Psi<\mu,\Pi>) = GE(\Psi\sigma^*\mu)\cap GE(\{\Psi\lambda_1,\ldots\Psi\pi_n\}\cup\{\Psi\pi_1,\ldots,\Psi\pi_n\}) = GE(\Psi<\sigma^*\mu,\Lambda\cap\Pi>)$$

comes from (8) the property:

$$\Psi(<\sigma,\Lambda>^*<\mu,\Pi>)=\Psi<\sigma^*\mu,\Lambda\cup\Pi> \quad (9)$$

We have also immediately the following property:

$$<\sigma,\{\lambda_1,\ldots,\lambda_n\}>\equiv\bot \quad (10)$$

if one of the $\lambda_i$ subsumes $\sigma$
which comes from:

$$\Psi<\sigma,\{\lambda_1,\ldots,\lambda_n\}>\equiv\bot \quad (11)$$

if for one of the $\lambda_i$,
$\Psi\lambda_i$ subsumes $\Psi\sigma$
as in this case the denotation is the empty set.

The properties (9) and (11) give together a sufficiently complete operational definition of generalized substitutions and then of instance subtraction. This can be augmented by the following properties which provide laws for simplifying contexts:

$$\Psi<\sigma,\Lambda\cup\{\mu\}>\equiv\Psi<\sigma,\Lambda> \text{ if } \Psi\mu^*\sigma=\bot \quad (12)$$

$$\Psi<\sigma,\Lambda\cup\{\mu\}>\equiv\Psi<\sigma,\Lambda> \quad (13)$$

if $\mu$ is subsumed by an element of $\lambda$.

We can define now the application of a standard substitution $\mu$ and of an instance subtraction related to $\mu$, here such an instance subtraction operator will be denoted by $(\epsilon-\mu)$, on a generalized term by:

$$\Psi<\sigma,\Lambda>\mu=\Psi<\sigma\mu,\Lambda> \quad (14)$$

$$\Psi<\sigma,\Lambda>(\epsilon-\mu)=\Psi<\sigma,\Lambda\cup\{\sigma\mu\}> \quad (15)$$

Note that in these definitions the substitution $\mu$ is intended to be applied on $\Psi\sigma$ and not on $\Psi$ directly. These definitions are the direct translation for generalized terms of properties (4) and (5).

Let $\mu$ be a standard substitution. This substitution will be said invalid for the generalized term $\Psi<\sigma,\{\lambda_1,\ldots,\lambda_n\}>$ whenever $\Psi\sigma\mu$ is subsumed by one of the $\Psi\lambda_i$. This is related to (11) as this property implies that the generalized term $\Psi<\sigma\mu, \{\lambda_1, \ldots, \lambda_n\}>$ corresponding to the instance $\Psi\sigma\mu$ is then denoting the empty set.

This notion of invalidity for substitution which comes with generalized terms is what leads to discard links in instance extraction methods. A link (internal or with another term) of a generalized term $\Psi<\sigma,\{\lambda_1,\ldots,\lambda_n\}>$ is a link of the standard term $\Psi\sigma$ (clause, superclause, etc). Let $\gamma$ be an mgu associated with a link. This link will be said invalid whenever $\gamma$ is an invalid substitution for $\Psi<\sigma,\{\lambda_1,\ldots,\lambda_n\}>$. Invalid links can be discarded as the generalized terms which would result of them by link instance generation are denoting the empty set.

Algorithms will be presented as examples to carry out the invention. Let $\Psi<\sigma, \Lambda>$ be a generalized term and $\mu$ a substitution which is valid for this generalized term. Instance extraction is then the following transformation rule on sets of generalized terms:

$$(IE)\Sigma\rightarrow(\Sigma-\{\Psi<\sigma,\Lambda>\})\cup\{\Psi<\sigma\mu,\Lambda^*\sigma\mu>,\Psi<\sigma,\Lambda\cup\{\sigma\mu\}>)$$

In practice this operation can be decomposed in two operations:

instance generation on generalized terms:

$$(IG) \frac{\Psi <\sigma, \Lambda>}{\Psi <\sigma\mu, \Lambda *\sigma\mu>}.$$

and instance subtraction on generalized terms:

$$(IS) \Psi<\sigma,\Lambda> \rightarrow \Psi<\sigma, \Lambda \cup \{\sigma\mu\}>)$$

Instance subtraction comes just to add a new substitution in the right part of the context of the generalized term that it is modifying, and to discard links which could have been previously computed and which are invalidated by this new substitution. It is also useful to test if some already present substitutions in $\Lambda$ are not subsumed by the new one, in which case they can be removed.

Instance generationon generalized terms is just like for standard terms, except that there it is the left part of the context which is concerned. In order to simplify the context, instead of generating $\Psi<\sigma\mu, \Lambda>$, it is better to generate $\Psi<\sigma\mu, \Lambda*\sigma\mu>$ which is denotationally equivalent, as then non relevant substitutions will be reduced to $\bot$ (see property (12)). Here $\Lambda*\sigma\mu$ means that each of the elements of $\Lambda$ are combined with $\sigma\mu$.

When computing links, their related mgu must be checked against the substitutions of the right part of the context in order to test their validity. Invalidated links are then discarded. To save time, instead of performing a subsumption test on two instances of the related standard term, it is sufficient to perform this on instances of the list of its variables. Thus the validation procedure can be described as follows:

Valid-link (L, $<\Psi,\sigma,\Lambda>$):
  Let $\gamma$ be an mgu of L
  Let V be the list of variables of $\Psi$
  Forall $\lambda$ in $\Lambda$ do:
    If V$\sigma\gamma$ is subsumed by V$\lambda$ then goto Exit-false;
  Return true;
  Exit-false: Return false;

The subsumption test itself can be achieved by using well-known algorithms.

Instance generation operation can be described by the following algorithm:

Generate ($\gamma,<\Psi,\sigma,\Lambda>, \Sigma$):
  Let V be the list of variables of $\Psi$
  Forall $\lambda$ in $\Lambda$ do:
    Let $\theta$ be an mgu of V$\lambda$ and V$\sigma\gamma$
    % $\lambda\theta$ is by definition $\lambda*\sigma\gamma$ %
    Replace $\lambda$ in $\Lambda$ by $\lambda\theta$;
  Add $<\Psi,\sigma\gamma,\Lambda>$ in the set $\Sigma$;
  End;

The composition a$\gamma$of two substitutions $\sigma$ and $\gamma$ required by the above algorithm can be computed by well-known algorithms.

Instance subtraction operation can be described by the following algorithm:

Subtract ($\gamma,<\Psi,\sigma,\Lambda>$):
  Let V be the list of variables of $\Psi$
  Forall $\lambda$ in $\Lambda$ do:
    If V$\lambda$ is subsumed by V$\sigma\gamma$
    Remove $\lambda$ from $\Lambda$;
  Insert $\sigma\gamma$ in $\Lambda$;
  % in case where links are precomputed %
  Let LL be the set of links of $\Psi\sigma$
  Forall L in LL do:
    Let $\theta$ be the mgu related to L
    If V$\theta$ is subsumed by V$\sigma\gamma$ then remove L form LL
  End;

Then we give the schematic algorithm of instance generation methods (note that standardizing apart is here left implicit) on clauses (generalized terms are then called generalized clauses):

Instance Generation Method on Generalized Clauses:
  % Preparation phase %
  Let ICS be the input clause set
  Let GCS=$\emptyset$
  Let NCS=$\emptyset$
  Forall $\Psi$ in ICS do: Add $\Psi_{gr}$ to GCS;
  % NCS contains generalized clauses %
  Forall $\Psi$ in ICS do: Add $<\Psi,\epsilon,\emptyset>$ to NCS;
Main-Loop:
  % refutation decision %
  If there is a link between two unit clauses of NCS
    then goto End1;
  If GCS is unsatisfiable on the ground level
    then goto End1;
  % unit reduction has priority %
  if there is a generalized clause $<\Psi,\sigma,\Lambda>$ in NCS
    which can be reduced by unit-reduction then
    Let $\Psi'$ be the reduced clause
    If $\Psi'$ is the empty clause then goto End1;
    Remove $<\Psi,\sigma,\Lambda>$ from NCS;
    Add $<\Psi',\sigma,\Lambda>$ to NCS;
    Remove $\Psi_{gr}$ from GCS;
    Add $\Psi'_{gr}$ to GCS;
    Goto Main-Loop;
  % satisfiability determined by exhaustion of all possible operations %
  If there is no valid link between generalized clauses of NCS
    then goto End2;
  % selection phase %
  % mgu of selected links are supposed to not be %
  % renaming substitutions %
  Select a valid link between two generalized clauses of NCS:

$$L=<<\Psi,\sigma,\Lambda>,\psi,<\Phi,\mu,\Pi>,\phi,\gamma>;$$

% link instance extraction step %
  Generate ($\gamma,<\Psi,\sigma,\Lambda>$, NCS);
  Subtract ($\gamma,<\Psi,\sigma,\Lambda>$);
  Generate ($\gamma,<\Phi,\mu,\Pi>$, NCS);
  Subtract ($\gamma,<\Phi,\mu,\Pi>$);
  % ground instance generation %
  Add $\Psi\sigma\gamma_{gr}$ and $\Phi\sigma\gamma_{gr}$ to GCS;
  Goto Main-Loop;
  End1: Print the input clause set is refuted; end.
  End2: Print the input clause set is satisfiable;
end.

Instance extraction method has the following fundamental property: it cannot generate by link instance extraction two variants which would be descending from a same initial clause. Note that it does not forbid two variants to be generated from different initial clauses but it appears that this is not of great practical importance and moreover this can be avoided by some proper preprocessing of the clause set which will not be explained here. Thus Instance extraction provides a preventive avoidance of the generation of variants which makes useless a curative elimination of variants, at least on the set of generalized clauses. Elimination of variants may remain needed on the set of ground clauses, but it is again of little importance as it just comes to be duplicate elimination and as moreover the present method is not concerned by this special set of ground clauses.

The second important property is that the replacement of instance generation by instance extraction preserves completeness. Any instance which could have been generated by link instance generation will be generated by link instance extraction, at least in one of its variant form. This is because instance extraction prevents only the generation of variants and does no other prevention of course when using purity this may lead to discard much more clauses, but then it remains safe. The fundamental point is that here instance extraction method remains a commutative system and thus escapes the problems encountered by Kowalski's link removal because this last strategy leads to cumbersome non commutative systems.

A third property is that any link which could have been removed by link removal is removed also by instance extraction: once a link of a clause $\Psi$ has been used any of its descendants in instances of $\Psi$ generated afterwards has a related mgu which is subsumed by the mgu of its father link. Thus instance subtraction makes these descending links invalid. So instance extraction can be viewed as a sound and powerful generalization of kowalski's link removal for instance generation methods. On the other hand, instance subtraction could not be applied soundly with resolution as it discards more links than link removal which itself may discard non redundant links as already noticed.

Instance extraction methods are bounded on the Bernays-Schönfinkel class of problems while they do not use curative variant elimination strategy. The proof is obvious: clauses have then only a finite number of non variant instances. Thus instance extraction will always stop after a finite number of steps as it generates with link instance extraction only non variant descendants of a same input clause. When using purity, which requires an exhaustive precomputation of links, instance generation methods can be bounded on much wider classes of problems than instance generation methods using curative variant elimination and resolution with usual subsumption.

Superclausal Formalism

The instance generation on superclausal formalism will now be presented. Clauses are lists or sets of literals of which intended logical meaning is usually to represent the disjunction of their literals. Resolution-based methods, as well as Lee and Plaisteds method, are working on formulas in clausal form. It, is possible to extend these methods to cope with any kind of quantifier-free formulas but such an extension would require much heavier computations than clausal formalism.

However, in the particular context of instance generation methods, there is a more general, but however still restricted, formalism than the clausal one which is very interesting while it has never been considered until now by people working on resolution-based method: superclauses. The name superclause is itself rather unusual while it can be found in some rare publications. A superclause is a list or a set of superliterals which are themselves a list or a set of literals. As clauses are intended to represent the disjunction of their literals, superclauses are intended to represent the disjunction of their superliterals which are themselves intended to represent the conjunction of their literals. In short a superclause is intended to represent a quantifier-free formula in disjunctive normal form. Then clauses can be viewed as a particular kind of superclauses, where superliterals have only one element.

The interest of superclausal formalism is that it is still a restricted formalism, quite similar to the clausal one, while it allows to represent most problems in a more economical way than the clausal formalism. For example the propositional formula $(P \wedge Q) \vee R$ can be directly represented by only one superclause, as it is already in disjunctive normal form, while it will need three clauses to be expressed in clausal formalism. In fact any formula can be put in disjunctive normal form, and thus any logical problem can be translated into one superclause. But, as for most problems such a superclause would be too big for computational purpose, it is better in such cases to break it in several smaller superclauses. This can be done by using any well-known algorithm intended to translate formulas into clausal formalism, at the expense of a slight modification which allows to stop at some level the translation process before its completion, this in order to not get only clauses.

Clausal formalism is a two level formalism:

the clause set which is intended to represent the conjunction of its elements.

the individual clauses

Superclausal formalism is a three level formalism:

the superclause set of conjunctive meaning.

Superclauses of disjunctive meaning.

Superliterals of conjunctive meaning

Two different superliterals which contain more than one literal cannot be opposite or complementary as it is the case for single literals. But if two superliterals contain opposite literals then any interpretation which makes true one of them makes false the other. Thus pair of opposite or complementary literals will play the same fundamental role in superclausal formalism than in clausal one. And the notion of link between superclauses will be quite similar to the notion of link between clauses, except that it is also needed to know into which superliterals are the literals of the link. So a link between superclauses will require seven fields instead of five in order to record this extra information.

However a new situation has to be considered: there may exist pairs of complementary literals inside a same superliteral. This leads to distinguish two kinds of links: external links between different superclauses and internal links between complementary literals of a same superliteral. In this last case two subcases have to be distinguished: the unsigned part of the literals can be directly unifiable or unifiable only after they have been standardized apart. For example, if the superliteral is $(p(X) \wedge \neg p(a))$, $p(a)$ and $p(X)$ are directly unifiable with an mgu: $\{X \rightarrow a\}$. But in $(p(X,a) \wedge \neg p(b,X))$, $p(X,a)$ and $p(b,X)$ are not directly unifiable while they are unifiable once standardized apart.

With a careful translation into superclausal formalism, this last subcase can be ignored. But for the sake of generality and to be sure to preserve completeness in any case it is better to consider it and to treat internal links within a same superliteral as if they were external links between two copies of a same superclause. But when using unit-reduction, in order to get more chances to find unit superclauses, i.e. superclauses with only one superliteral, it is also possible to consider internal links with mgu related to the direct unification of the literals, i.e. unification of the literals not standardized apart.

This gives the following algorithm to compute links in superclausal formalism (here SC1 stands for superclause 1, SL1 stands for the considered superliteral in this superclause, and L1 the considered literal of SL1, idem for SC2, SL2, L2):

Compute-and-Store-link(SC1,SL1,L1,SC2,SL2,L2):
  % external link. Similar to the clausal case %
  When SC1≠SC2
    Let γ=mgu(|L1|, |L2|)
    If γ≠⊥
      then
        Store the link <SC1,SL1,L1,SC2,SL2,L2, γ>;
  % internal link. Specific to the superclausal case %
  When SC1=SC2 and SL1=SL2
    Let γ=mgu(|L1|, |Standardize(L2)|)
    If γ≠⊥
      then
        % if not using unit-reduction skip the next three lines %
        Let θ=mgu(|L1|, |L2|)
        If θ≠⊥ then
          Store the link <SC1,SL1,L1,SC1,SL1,L2, θ>;
        If γ is not a renaming substitution on SL1
          then
            Store the link <SC1,SL1,L1,SC1,SL1,L2, γ>
          else
            Let γ=mgu(|L2|, |Standardize(L1)|)
            Store the link <SC1,SL1,L2,SC1,SL1,L1, γ>;
end;

Note that in the above algorithm to test if a substitution γ is a renaming substitution on a term, it is just sufficient to test if Vγ subsumes V, where V is the list of variables of the term: if it is the case then γ is a renaming for the term.

In case where two opposite literals are in a same superliteral it is assumed that this is detected and that the superliteral is removed form the superclause when it is built. It is also assumed that when recording internal links, duplicate ones are detected and discarded.

Except this particular modification of link computation, instance generation method on superclause sets is almost identical to the clausal case. There is only one basic modification: when dealing with internal links it will generate at most one instance instead of two (as these two instances would be variants). Note that if the two literals of an internal link are variants no instance will be generated upon this link: these literals will become opposite in the ground instance generated by ground instance generation and the related superliteral will be removed from the ground superclause. Unit-reduction remains similar to what it is in the clausal case: if a superliteral of a superclause $\Psi$ has a literal which is a negated instance of a literal occurring: in an unit superclause then the superliteral where occurs this literal can be removed from the superclause $\Psi$. The justification of this is that for any interpretation which satisfies a unit superclause, the superliteral of $\Psi$ which has such a link with this unit superclause is falsified.

There it should be noted that ground instances of superclauses are superclauses and then to check unsatisfiability on the ground level, methods like ground resolution, Davis and Putnam method, etc, which are dedicated to the clausal formalism cannot be directly applied. But non-clausal methods like the ground connection method for example can be used. A superpath of a superclause set is any list of superliterals such that each element of this list occurs in a different superclause. A superpath is said complete when its length is the cardinal of the clause set. The path related to a superpath is the list of literals obtained by concatenating the list of literals of each superliterals of the superpath. A superpath is said to have a connection when there is a connection, i.e. a pair of opposite literals, in its related path. The ground connection principle says then that a ground superclause set is unsatisfiable if and only if it has no connection-free superpath.

Then instance generation methods generalized in this way to cope with superclausal formalism are sound and complete proof methods. The reason why is obvious: any connection which could appear on the ground level in reason of an internal link will be obtained through link instance generation on internal link computed in the way indicated by the above algorithm.

Purity can be used with superclausal formalism. But here the notion of pure literal has to be replaced by the notion of pure superliteral: a superliteral will be said pure if it has neither external link nor internal link. Thus to be pure it is not enough that a superliteral contains a pure literal: all its literals must be pure.

Half-links and Half-unifiers

Half-links and half-unifiers will be now presented. Until now it has been assumed that the substitution related to a link was a most general unifier of two literals and that to compute such most general unifiers, clauses or superclauses had to be standardized apart. This would be quite space consuming, as the number of variable names would be ever growing. However the importance of standardizing apart is mainly related to the needs of resolution. With instance generation methods, clauses or superclauses are never combined, and thus standardizing apart can be avoided.

This can be achieved by using an unification algorithm which operates on copies of the literals where variables are tagged, e.g. they are pairs <variable name, tag>. Variables occurring in one of the term can then be tagged differently than the one occurring in the other term. Then the unification algorithm will return substitutions where variables are such tagged variables:

Unify(L1, L2, tag1, tag2):
    Let L1 be a copy of L1 where variables are tagged by tag1
    Let L2 be a copy of L2 where variables are tagged by tag2
    Return Unify-with-tagged-vars(L1, L2);

To extract from such an mgu substitutions with non tagged variables, the following algorithm can be used:

Extract-Half(mgu, tag):
    Let Res be a copy of mgu where all variables tagged by tag are replaced by untagged variables of same name
    Remove from Res all unit substitutions on tagged variables;
    Replace tagged variables in Res by new untagged variables;
    Return Res;

For example, we want to unify the unsigned parts of two literals, p(X,a) and –p(b,X), belonging to two different clauses which share a same variable name: Unify(p(X,a), p(b,X), 1, 2) will yield the mgu on tagged variables: {<X, 1>→b, <X,2>→a}. Then the function Extract-Half({<X, 1>→b, <X,2>→a}, 1) will return {X →b}, and Extract-Half ({<X,1>→b, <X,2>→a}, 2) will return {X→a}.

The substitutions that Extract-Half returns are what we shall call most general half-unifiers an half-unifier of a term $\psi$ for a term $\phi$ is any substitution σ such that $\psi$σ is an instance of $\phi$. And a most general half-unifier is an half-unifier yielding a most general instance.

Thus Extract-Half(γ, 1) extracts from the mgu γ resulting of Unify(L1, L2, 1, 2) a most general half-unifier of L1 for L2, while Extract-Half(γ, 2) extracts a most general half-unifier of L2 for L1. Note also that if the two terms to unify are tagged by the same tag, extract-half will just transforms the mgu with tagged variables by their direct mgu.

Now let $\psi$ and $\phi$ be two terms which are unifiable once standardized apart, and σ1 be a most general half-unifier of ψ for φ and σ2 a most general half-unifier of φ for ψ. Then comes immediately the fundamental property:

$$\psi\sigma1=\phi\sigma2$$

The purpose of link instance generation is that links between parent clauses will become connections between ground clauses obtained by ground instance generation from the instances obtained by link instance generation. All that is needed to obtain a connection (pair of opposite literals) by ground instance generation is that the unsigned part of the literals in a link are variants. This particular kind of link will be called here quasi-connection. To get quasi-connections through link instance generation (on external links in the superclausal case) it is possible to use, instead of an mgu, two complementary most general half-unifiers. Thus link instance generation rule can be modified to become what we shall call half-link instance generation rule:

$$(HIG) \quad \frac{\Psi, \Phi}{\Psi\sigma1, \Phi\sigma2}$$

where σ1 and σ2 are two complementary most general half-unifiers of the literals of a link between ψ and Φ.

In order to minimize the number of new variables introduced at each step, we introduce now a modified version of Extract-Half:

Extract-Minimal-Half(mgu, tag):
  Let Res be a copy of mgu where all variables tagged by tag are replaced by untagged variables of same name
  Remove from Res all unit substitutions on tagged variables;
  % minimization loop %
  Forall unit substitution u in Res do:
    When the right side of u is a tagged variable replace in Res all occurrences of this variable by the left side of u and remove u from Res;
  Replace remaining tagged variables in Res by new untagged variables;
  Return Res;

This algorithm computes most general half-unifiers which have in their codomain no other variables than the variables of the clause or superclause upon which it will be applied by half-link instance generation, except in cases where functional terms are involved. This allows to introduce no new variables except those which are absolutely needed. A second interesting consequence is that Extract-Minimal-Half will always yield the empty substitution in cases where most general half-unifiers are renaming substitutions. This allows to not need extra tests to discard instance generations which would directly produce a variant instance. Half-unifiers yielded by Extract-Minimal-Half will be called minimal most general half-unifiers.

To cope with the HIG rule it is better to use in addition to the usual link representation, what we shall call half-links. An half-link is a triplet <num, subst, pL> where num is the number 1 or 2, subst a minimal most general half-unifier and plink a pointer to a link L. Link themselves will be represented with two new fields which are pointers to their complementary half-links. Thus the half-link <1, σ1, pL> means the half-link from the first literal of the link L to the second, while <2, σ2°, pL> means the half-link from the second literal of L to the first. An half-link where the substitution is the empty substitution will be called and half-quasi-connection. To compute half-links a modification of the function Compute-link is needed. It will be replaced by the following procedure:

Compute-and-Store-Half-links(SC1, SL1, L1, SC2, SL2, L2):
  % external links and internal links: same computation
  When SC1≠SC2 or (SC1=SC2 and SL1=SL2)
    Let γ=Unify(|L1|, |L2|, 1, 2)
    If γ≠⊥ then
      Store the link L=<nil, nil, SC1,SL1,L1,SC2,SL2,L2>;
      Let pL be the pointer to L
      Let σ1=Extract-Minimal-Half(γ, 1)
      Store the half-link HL1=<1, σ1, pL>;
      Let σ2=Extract-Minimal-Half(γ, 2)
      Store the half-link HL2=<2, σ2, pL>;
      Let pHL1 be the pointer to HL1
      Let pHL2 be the pointer to HL2
      Replace the first field of L by pHL1;
      Replace the second field of L by pHL2;
  % if not using unit-reduction skip the next lines %
  When SC1=SC2 and SL1=SL2
    Let θ=Unify(|L1|, |L2|, 1, 1)
    If θ≠⊥ then
    Store the link
      L=<nil, nil, SC1,SL1,L1,SC2,SL2,L2>;
    Let pL be the pointer to L
    Let θ1=Extract-Minimal-Half(θ, 1)
    Store the half-link HL1=<1, θ1, pL>;
    % ε is the empty substitution %
    Store the half-link HL2=<2, ε, pL>;
    Let pHL1 be the pointer to HL1
    Let pHL2 be the pointer to HL2
    Replace the first field of L by pHL1;
    Replace the second field of L by pHL2;
end;

Note that here internal links which may occur with superclausal formalism receive the same treatment as external links: two half-links are generated which may lead to generate two instances at each step even if it is performed upon an internal link. But there, if the literals of an internal link, are directly unifiable without being standardized apart, another pair of half-links is also considered when using unit-reduction.

Near-quasi-connection Principle

Instance generation methods operate in two phases: upon links they generate instances with a quasi-connection between them thanks to link instance generation or half-link instance generation. Then this quasi connection becomes a connection thanks to ground instance generation. To show that a ground clause (or superclause) set is unsatisfiable the ground connection principle states that it is then necessary and sufficient to show that it has no connection-free complete path. A ground set which has no connection-free complete path is also said by Bibel to have a complete spanning set of connections.

Here we show that to be applied the ground connection principle does not require ground instance generation.

The point is that when two clauses (or superclauses) have a quasi-connection between them, their ground instances produced by ground instance generation will have a connection inherited from this quasi-connection. On the other hand it can be noticed that a connection on the ground level can be inherited from links which are not quasi-connections: For example the two literals p(X,X) and –p(X,Y) have a link which is not a quasi-connection while ground instance generation will transform them into opposite literals by replacing all variables by a same constant. Such a kind of link will be called a near-quasi-connection. A near-quasi-connection is characterized by the fact that its related mgu and most general half-unifiers contain only unit substitutions which associate variables to variables.

Thus comes the fundamental property which lifts directly the ground connection principle to the first-order level and that we shall call the near-quasi-connection principle:

The ground set corresponding via ground instance generation to a clause or superclause set has a complete spanning set of connections if and only if the clause or superclause set has a complete spanning set of near-quasi-connections, i.e. it has no near-quasi-connection-free complete path.

Thanks to this near-quasi-connection principle it is not needed to generate a ground set by ground instance generation to prove that it is unsatisfiable. This means that instance generation methods can be simplified into link instance generation and connection methods where there is no ground instance generation, and where unsatisfiability and satisfiability are checked in the initial part of the main loop of the schematic algorithm by:

Link instance generation and connection method:
Main-Loop:
% refutation decision %
If there is a link between two unit clauses of NCS then goto End1,
If NCS has a complete spanning set of near-quasi-connection then goto End1;
% satisfiability decision %
If NCS has a complete path which is free of any kind of link
then goto End2;
. . .
% the sequel is link instance generation phase %
% like it is in instance generation methods %
%but without any further ground instance generation%

There are well-known algorithms to search efficiently a connection-free complete path in a ground clause or superclause set. These algorithms can be directly adapted to search a near-quasi-connection free complete path in a non ground set.

Note that the only reason to use most general unifiers or half-unifiers to generate instances is due to unit-reduction. If unit-reduction is not used, it is possible to simplify the substitutions which are applied by removing their unit substitutions which have a variable as right side. Unifiers would then be replaced by near-unifiers.

HICS method.

A new method can be obtained by the combination of the four afore-mentioned improvements:

Replacement of instance generation rule by instance extraction on generalized terms.

Generalization to superclausal formalism.

Replacement of link: instance generation rule by half-link instance generation rule on half-links.

Replacement of ground instance generation and unsatisfiability checking on the ground set by using the near-quasi-connection principle.

This new method will be called Half-Link Instance-Extraction and Connection, on Superclauses method, in short HICS method. HICS method can be viewed as belonging to the family of instance generation methods. But it can also be viewed as being inspired by some of the features of Bibels connection method. Indeed HICS method combines the advantages of instance generation methods and of the ground connection method. But its main innovative feature is that in addition it uses an original means to prevent redundant deductions which relies on a sound and clear theoretical basis and on very specific algorithms. This new solution provides a strong and safe prevention of redundant deduction steps which is sufficient to not need any completion by some curative strategy like variant elimination. This leads HICS method to be free of the common drawback of other proof methods: for example, while not using any curative strategy, HICS method is bounded for the Bernays-Schöfinkel class of problems. In fact it is bounded on a much wider class of solvable problems, the boundaries of this class being yet unknown. Moreover, contrary to Kowalski's link removal, to prevent redundant deductions HICS method does not require to use clause graph heavy machinery instead of simple clause sets, although it does not forbid to use clause graph approach. HICS method involves also other important enhancements which contribute to get both better performances and robustness.

To sum up, HICS method relies in fact on four complementary but independent innovations:

A new basic operation on formulas that we name instance subtraction. This new operation is intended to be used in complement of instance generation. We call instance extraction the original operation resulting of the combination of instance subtraction and instance generation. Replacing instance generation by instance extraction is the means which achieves the strong prevention of redundant deductions of HICS method. Instance subtraction relies itself, both theoretically and practically, on a mathematically sound generalization of the usual notions of terms and substitutions which leads directly to practical algorithms. While it is based on quite different principles than Kowalski's link removal, instance subtraction can discard all the links that would be discarded by link removal in instance generation methods. It discards much more links, but safely as it will be shown.

An original extension of link instance generation from clausal to more general and less usual superclausal formalism. Note that, at least in theory, resolution also can be extended to cope with non strictly clausal formalisms. But such non-clausal extensions of resolution seems of little practical interest, while HICS method shows often better performances on superclausal expression of problems than on strictly clausal expression.

A specific refinement of the usual notion of most general unifier and a related algorithm. We name this original refinement minimal most general half-unifier. The usual notions of link and connection are then also refined by the ones of half-link and half-connection. This allows HICS method to be less space and time consuming.

An original use of the ground connection principle on the non ground level in the context of instance generation methods. Thanks to this, it is not necessary to complete link instance generation rule with ground instance generation rule. This also allows to save much time and space.

Each of these four innovations can be used separately to enhance any instance generation method. HICS method results from their fruitful combination. It has been shown that each of these innovations preserves completeness and soundness-ok the general method. Also, how they can be combined safely in HICS method has been explained.

Thus, the combination of the four enhancements leads to the HICS method, which relies on the following transformation rules on generalized superclause sets: half-link instance extraction and optionally unit-reduction. This method can optionally use purity to discard superclauses with a pure superliteral. It can also use tautology elimination when a means is provided to determine if a superclause is tautological, which can be done by reduction of superclauses to canonical disjunctive normal form. HICS method is a complete proof method for unrestricted first-order logic.

To mix these enhancements, we extend the test of validity of links to cope with the case of links between generalized superclauses. This gives, for example, the final version of this algorithm:

```
Compute-and-Store-Half-links(GSC1,SL1,L1,GSC2,
    SL2,L2):
  with GSC1=<SC1,μ1,Λ1> and GSC2=<SC2,μ2,Λ2>
  %external links and internal links: same computation%
  When GSC1≠GSC2 or (GSC1=GSC2 and SL1=SL2)
    Let γ=Unify(|L1|, |L2|, 1, 2)
    Let σ1=Extract-Minimal-Half(γ, 1)
    Let σ2=Extract-Minimal-Half(γ, 2)
    If Valid-subst (σ1, <SC1,μ1,Λ1>) and
        Valid-subst (σ2, <SC1,μ2,Λ2>)
      then
        Store the link
        L=<nil, nil, GSC1,SL1,L1,GSC2,SL2,L2>;
        Let pL be the pointer to L
        Store the half-link HL1=<1, σ1, pL>;
        Store the half-link HL2=<2, σ2, pL>;
        Let pHL1 be the pointer to HL1
        Let pHL2 be the pointer to HL2
        Replace the first field of L by pHL1;
        Replace the second field of L by pHL2;
  % if not using unit-reduction skip
    the next lines %
  When GSC1=GSC2 and SL1=SL2
    Let θ=Unify(|L1|, |L2|, 1, 1)
    Let θ1=Extract-Minimal-Half(θ, 1)
    If Valid-subst (θ1, <SC1,μ1,Λ1>)
      then
        Store the link
        L=<nil, nil, GSC1,SL1,L1,GSC2,SL2,L2>;
        Let pL be the pointer to L
        Store the half-link HL1=<1, θ1, pL>;
        Store the half-link HL2=<2, ε, pL>;
        Let pHL1 be the pointer to HL1
        Let pHL2 be the pointer to HL2
        Replace the first field of L by pHL1;
        Replace the second field of L by pHL2;
end;
```

With Unify as in V and Valid-subst defined by:

```
Valid-subt (σ, <Ψ, μ,Λ>):
  Let V be the list of variables of Ψ
  Forall λ in Λ do:
    If Vμσ is subsumed by Vλ then goto Exit-false;
  Return true;
  Exit-false: Return false;
```

Note that when not using unit-reduction, Extract-Minimal-Half can be augmented in order to remove all unit substitutions which replace a variable by another variable. In this case it would yield a near-half-unifier:

```
Extract-Minimal-Half(mgu, tag):
  Let Res be a copy of mgu where all variables tagged by
    tag are replaced by untagged variables of same name
  Remove from Res all unit substitutions on tagged
    variables;
  % minimization loop %
  Forall unit substitution u in Res do:
    When the right side of u is a tagged variable
      replace in Res all occurrences of this variable by
        the left side of u and remove u from Res;
  Replace remaining tagged variables in Res by new
    untagged variables;
  % if using unit-reduction skip the next line %
  Remove from Res all unit substitutions with right side
    being a variable;
  Return Res;
```

Then we can state the algorithm of HICS method:

HICS Method:
```
  % Preparation phase %
  Let ISCS be the input superclause set
  Let GSCS=Ø
  % GSCS contains generalized superclauses %
  Forall Ψ in ISCS do: Add <Ψ,ε,Ø> to GSCS;
Main-Loop:
  % refutation decision %
  If there is a link between two unit superclauses of
      GSCS
    then goto End1,
  If GSCS has a complete spanning set of near-quasi-
      connection
    then goto End1;
  % satisfiability decision %
  If GSCS is empty then goto End2;
  If GSCS has a complete path which is free of any kind
      of link
    then goto End2;
  % optional unit-reduction phase %
  % unit reduction has priority %
  if there is a generalized clause <Ψ, σ, Λ> in GSCS
      which can be reduced by unit-reduction
    then
      Let Ψ' be the reduced clause
      If Ψ' is the empty clause then goto End1;
      Remove <Ψ, σ, Λ> from GSCS;
      Add <Ψ', σ, Λ> to GSCS;
      Goto Main-Loop;
  % selection phase %
  % selected links are supposed to not be
  quasi-connections %
  Select a valid link between two generalized super-
      clauses of GSCS which is not a quasi-connection:

L=<pHL1,pHL2,<SC1, μ1, Λ1>,SL1,L1,<SC2,μ2,Λ2>,SL2,L2>
      with HL1=<σ1, L> and HL2=<σ2, L>;

% link instance extraction step %
  If σ1≠ε then
    Generate(σ1,<Ψ,μ1,Λ1>, GSCS);
    Subtract((σ1,<Ψ,μ1,Λ1>);
  If σ2≠ε then
    Generate(σ2,<Ψ,μ2,Λ2>, GSCS);
    Subtract((σ2,<Ψ,μ2,Λ2>);
  % optional %
  Remove pure and tautological superclauses of GSCS;
  Goto Main-Loop;
End1: Print the input clause set is refuted; end.
End2: Print the input clause set is satisfiable;
end.
```

With Generate being as already defined in the above section relating to the instance extraction:

```
Generate(γ,<Ψ,σ,Λ>, Σ):
  Let V be the list of variables of Ψ
  Forall λ in Λ do:
    Let θ be an mgu of Vλ and Vσγ
    % λθ is by definition λ*σγ %
    Replace λ in Λ by λθ;
  % link computation can been done when adding the
    superclause %
```

Add <Ψ,σγ,Λ> in the set Σ;
End;
Instance subtraction operation can be described by the following algorithm, which is like the one given in III except that it takes into account half-links:
Subtract (γ,<Ψ,σ,Λ>):
  Let V be the list of variables of Ψ
  Forall λ in Λ do:
  If Vλ is subsumed by Vσγ
    Remove λ from Λ;
  Insert σγ in Λ;
  % in case where links are precomputed %
  Let HLL be the set of half-links of Ψσ
  Forall HL in HLL do:
    Let θ be the most general half-unifier related to HL
    If Vθ is subsumed by Vσγ
      then
        Let L be the link related to HL
        Let HL be the other half-link related to L
        Remove HL:
        Remove L;
        Remove HL;
End;

In HICS method, when adding a new generalized superclause, tautology elimination and purity can be used to discard unneeded superclauses. When a clause is discarded all its half-links and related links are removed from memory.

HICS method can be extended to cope with hyperlinks instead of simple links. We shall call hyper-half-link of a superclause a list of half-links of the superclause such that there is in this list one and only one half-link of each of the superliterals of the superclause. To an hyper-half-link is associated a substitution which results from the combination of the half-unifiers of the half-links of the hyper-half-link. The hyper-half-link is said valid when its associated substitution is a valid substitution. Then hyper-half-link instance generation is the following rule:

$$\text{(HHIG)} \quad \frac{\Psi}{\Psi\theta}$$

where θ is the substitution associated to a valid hyper-half-link of Ψ.

Note that to compute hyper-half-links it is needed to consider also the links and half-links between literals occurring in different superliterals of a same superclause, which is not needed otherwise.

A generalized superclause will be said hyperpure when it has no valid hyper-half-link. Then an hyperpure superclause can be eliminated, this deletion strategy being called Super-Purity. Note that when an half-link cannot be element of any valid hyper-link then it can be removed.

The method resulting from the replacement of half-link instance extraction by hyper-half-link instance extraction will be called HHICS method. It can be defined, for example, by the following algorithm:

HHICS Method:
  % Preparation phase %
  Let ISCS be the input superclause set
  Let GSCS=Ø
  % GSCS contains generalized superclauses %
  Forall Ψ in ISCS do: Add <Ψ,ε, Ø> to GSCS;

Main-Loop:
  % refutation decision %
  If there is a valid link between two unit superclauses of GSCS
    then goto End1,
  If GSCS has a complete spanning set of near-quasi-connection
    then goto End1;
  % satisfiability decision %
  If GSCS is empty then goto End2;
  If GSCS has a complete path which is free of any kind of link
    then goto End2;
  % optional unit-reduction phase %
  % unit reduction has priority %
  if there is a generalized clause <Ψ,σ,Λ> in GSCS which can be,reduced by unit-reduction (upon a valid half-quasi-connection with an unit superclause)
    then
      Let Ψ" be the reduced clause
      If Ψ' is the empty clause then goto End1;
      Remove <Ψ, σ, Λ> from GSCS;
      Add <Ψ, σ, Λ> to GSCS;
      Goto Main-Loop;
  % selection phase %
  % selected hyper-links are supposed to not be %
  % hyper-quasi-connections, i.e. %
  Select a valid hyper-half-link of some superclause <Ψ,μ,Λ> with associated substitution θ;
  % link instance extraction step %
  Generate(θ,<Ψ,μ,Λ>, GSCS);
  Subtract-hyper(θ,<Ψ,μ,Λ>);
  Remove tautological superclauses;
  Remove hyperpure superclauses;
  Goto Main-Loop;
  End1: Print the input clause set is refuted; end.
  End2: Print the input clause set is satisfiable;
end.
With:
Subtract -hyper(γ,<Ψ,σ,Λ>):
  Let V be the list of variables of Ψ
  Forall λ in Λ do:
    If Vλ is subsumed by Vσγ
      Remove λ from Λ;
    Insert σγ in Λ;
    % in case where links are precomputed %
    Let HHLL be the set of hyper-half-links of Ψσ
    Forall HHL in HHLL do:
      Let θ be the substitution related to HHL
      If Vθ is subsumed by Vσγ
        then
Remove HHL;
  Remove-half-links (<Ψ,σ,Λ>);
  End;
Remove-half-links (<Ψ,σ,Λ>)
Let HLL the set of half-links of <Ψ,σ,Λ>
Forall HL in HLL do:
  If HL is in no valid: hyper-half-link
    then
      Let L be the link related to HL
      Let HL be the other half-link related to L
      Let HHLL be the set of hyper-half-links where occurs HL
      Forall HHL in HHLL do:
        Remove HHL;

Remove HL:
Remove L;
Remove HL;
end;

What is claimed is:

1. A computer-implemented method of automated proving for unrestricted first-order logic to test the unsatisfiability of a set of input terms ($\Psi$) representative of clauses or superclauses, the set of input terms describing an industrial system, the method comprising the steps of:

(1) mapping in a computer each of the input terms ($\Psi$) onto an equivalent generalized term defined as a triplet $<\Psi,\epsilon,\emptyset>$, where $\epsilon$ is an empty substitution and $\emptyset$ is an empty set, to form a set ($\Sigma$) of generalized terms;

(2) applying, in the computer, to the set ($\Sigma$) an instance extraction rule (IE) defined as follows:

$$(IE) \Sigma \rightarrow (\Sigma - \{\Psi<\sigma,\Lambda>\}) \cup \{\Psi<\sigma\mu,\Lambda*\sigma\mu>,\Psi<\sigma,\Lambda\cup\{\sigma\mu\}>\}$$

where $\sigma$ is a substitution, $\Lambda$ is a finite set of standard substitutions $\{\lambda_1, \ldots, \lambda_\nu\}$, the doublet $<\sigma, \Lambda>$ is a generalized substitution which maps a standard term onto a generalized term defined as a triplet $<\Psi,\sigma,\Lambda>$ such that $<\Psi,\sigma,\Lambda>=\Psi<\sigma,\Lambda>$, $\mu$ is a substitution valid for the generalized term $\Psi<\sigma,\Lambda>$ and $\Psi\sigma$ is an instance of $\Psi$ yielded by the substitution $\sigma$ and is a standard term equivalent to the generalized term $<\Psi, \sigma, \emptyset>$, the instance extraction rule (IE) resulting from an instance generation rule (IG) and an instance subtraction rule (IS), the instance generation rule being defined as:

$$(IG) \frac{\Psi<\sigma, \Lambda>}{\Psi<\sigma\mu, \Lambda*\sigma\mu>}$$

and the instance subtraction rule being defined as:

$$(IS) \Psi<\sigma,\Lambda> \rightarrow \Psi<\sigma,\Lambda\cup\{\sigma\mu\}>$$

meaning that the triplet $\Psi<\sigma, \Lambda>$ should be replaced with $\Psi<\sigma,\Lambda\cup\{\sigma\mu\}>$, the step (2) resulting in a current set ($\Sigma$);

(3) generating, in the computer, a ground instance GIG($\Sigma$) of the current set $\Sigma$, the ground instance generation GIG being a ground substitution replacing every variable with a same fixed constant and defined by the rule:

$$(GIG) \frac{\Psi}{\Psi_{gr}}$$

where $\Psi_{gr}$ is a ground instance of term $\Psi$, the ground instance $\Psi_{gr}$ being obtained by replacing every variable with a same fixed constant;

(4) applying and repeating steps (2) and (3) in the computer until the ground instance GIG($\Sigma$) of the current set ($\Sigma$) is unsatisfiable;

(5) determining, in the computer, the unsatisfiability of the set of input terms when the ground instance GIG($\Sigma$) is unsatisfiable; and (6) controlling development of the industrial system using information on the unsatisfiability of the input terms.

2. A method according to claim 1, wherein the instance generation rule (IG) is modified to become a half-link generation rule defined by $$(HIG) \frac{\Psi, \Phi}{\Psi\sigma1, \Phi\sigma2}$$

where $\sigma1$ and $\sigma2$ are two complementary most general half-unifiers of the literals of a link between the term $\Psi$ and another term $\Phi$, a most general half-unifier being defined as a half-unifier yielding a most general instance and a half-unifier of the term $\Psi$ for the term $\Phi$ being defined as a substitution $\sigma$ such that the instance $\Psi\sigma$ is an instance of $\Phi$.

3. A method according to claim 2, wherein step (2) further comprises computing most general half-unifiers which have in respective codomains thereof no other variables of the term upon which the half-link instance generation will be applied, except in cases where functional terms are involved.

4. A method according to claim 1, wherein the input terms are superclauses, a superclause being defined as a list or a set of superliterals which are themselves a list or a set of literals.

5. A method according to claim 1, wherein a term of the set of input terms has a hyper-half-link when in a list of half-links of the term there is one and only one half-link of each of the literals of the term and the step (2) is applied by replacing the substitution $\sigma$ with a substitution $\theta$ associated to a valid hyper-half-link of the term $\Psi$, the resulting instance generation (IG) being called a hyper-half-link generation.

6. A method according to claim 5, wherein the term is a superclause and the hyper-half-link generation further comprises a superpurity elimination strategy of eliminating hyperpure superclauses defined when a generalized superclause has no valid hyper-half-link.

7. A computer-implemented method as defined in claim 1, wherein said industrial system is a general purpose automated reasoning system.

8. A computer-implemented method as defined in claim 1, wherein said industrial system is a truth maintenance system.

9. A computer-implemented method as defined in claim 1, wherein said industrial system is a domain-oriented specific application using automatic reasoning.

10. A computer-implemented method as defined in claim 1, wherein said industrial system is a methodological tool for the conception of information systems.

11. A computer-implemented method as defined in claim 1, wherein said industrial system is a software library.

12. A computer-implemented method as defined in claim 1, wherein said industrial system is a dynamic device or system.

13. A computer-implemented method as defined in claim 1, wherein said industrial system is a real device or system.

14. The computer-implemented method of claim 1, wherein the industrial system is selected from the group consisting of:
   a general purpose automated reasoning system,
   a truth maintenance system,
   a domain-oriented specific application using automatic reasoning,
   a methodological tool for the conception of information systems,
   a software library,
   a hardware co-processor, and
   a dynamic device or system.

15. The computer-implemented method of claim 1 wherein the industrial system is a data storage system.

16. The computer-implemented method of claim 1 wherein the industrial system is a hardware component.

17. The computer-implemented method of claim 1 wherein the industrial system is a tangible physical system outside the computer performing the method.

18. An information carrier including a computer-readable medium having a program stored therein which enables automated proving for unrestricted first-order logic to test the unsatisfiability of a set of input terms ($\Psi$) representative of clauses or superclauses, the set of input terms describing an industrial system, said program comprising:

(1) means for mapping each of the input terms ($\Psi$) onto an equivalent generalized term defined as a triplet <$\Psi,\epsilon,\emptyset$>, where $\epsilon$ is an empty substitution and $\emptyset$ is an empty set, to form a set ($\Sigma$) of generalized terms;

(2) means for applying to the set ($\Sigma$) an instance extraction rule (IE) defined as follows:

$$(IE)\ \Sigma \rightarrow (\Sigma - \{\Psi<\sigma,\Lambda>\}) \cup \{\Psi<\sigma\mu,\Lambda*\sigma\mu>,\Psi<\sigma,\Lambda\cup\{\sigma\mu\}>)$$

where $\sigma$ is a substitution, $\Lambda$ is a finite set of standard substitutions $\{\lambda_1,\ldots,\lambda_\nu\}$, the doublet <$\sigma,\Lambda$> is a generalized substitution which maps a standard term onto a generalized term defined as a triplet <$\Psi,\sigma,\Lambda$> such that <$\Psi,\sigma,\Lambda$>=$\Psi$<$\sigma,\Lambda$>, $\mu$ is a substitution valid for the generalized term $\Psi$<$\sigma,\Lambda$> and $\Psi\sigma$ is an instance of $\Psi$ yielded by the substitution $\sigma$ and is a standard term equivalent to the generalized term <$\Psi,\sigma,\emptyset$>, the instance extraction rule (IE) resulting from an instance generation rule (IG) and an instance subtraction rule (IS), the instance generation rule being defined as:

$$(IG)\ \frac{\Psi<\sigma,\Lambda>}{\Psi<\sigma\mu,\Lambda*\sigma\mu>}$$

and the instance subtraction rule being defined as:

$$(IS)\Psi<\sigma,\Lambda> \rightarrow \Psi<\sigma,\Lambda\cup\{\sigma\mu\}>$$

wherein the triplet $\Psi$<$\sigma,\Lambda$> is replaced with $\Psi$<$\sigma,\Lambda\cup\{\sigma\mu\}$>, thereby resulting in a current set ($\Sigma$);

(3) means for generating a ground instance GIG($\Sigma$) of the current set $\Sigma$, the ground instance generation GIG being a ground substitution replacing every variable with a same fixed constant and defined by the rule:

$$(GIG)\ \frac{\Psi}{\Psi_{gr}}$$

where $\Psi_{gr}$ is a ground instance of term $\Psi$, the ground instance $\Psi_{gr}$ being obtained by replacing every variable with a same fixed constant;

(4) means for reusing the means defined by elements (2) and (3) above until the ground instance GIG($\Sigma$) of the current set ($\Sigma$) is unsatisfiable; and (5) means for determining the unsatisfiability of the set of input terms when the ground instance GIG($\Sigma$) is unsatisfiable.

19. A computer-readable medium having a program stored therein which enables automated proving for unrestricted first-order logic to test the unsatisfiability of a set of input terms ($\Psi$) representative of clauses and superclauses, the set of input terms describing an industrial system, said program comprising:

(1) means for mapping each of the input terms ($\Psi$) onto an equivalent generalized term defined as a triplet <$\Psi,\epsilon,\emptyset$>, where $\epsilon$ is an empty substitution and $\emptyset$ is an empty set, to form a set ($\Sigma$) of generalized terms;

(2) means for applying to the set ($\Sigma$) an instance extraction rule (IE) defined as follows:

$$(IE)\Sigma \rightarrow (\Sigma - \{\Psi<\sigma,\Lambda>\}) \cup \{\Psi<\sigma\mu,\Lambda*\sigma\mu>,\Psi<\sigma,\Lambda\cup\{\sigma\mu\}>)$$

where $\sigma$ is a substitution, $\Lambda$ is a finite set of standard substitutions $\{\lambda_1,\ldots,\lambda_\nu\}$, the doublet <$\sigma,\Lambda$> is a generalized substitution which maps a standard term onto a generalized term defined as a triplet <$\Psi,\sigma,\Lambda$> such that <$\Psi,\sigma,\Lambda$>=$\Psi$<$\sigma,\Lambda$>, $\mu$ is a substitution valid for the generalized term $\Psi$<$\sigma,\Lambda$> and $\Psi\sigma$ is an instance of $\Psi$ yielded by the substitution $\sigma$ and is a standard term equivalent to the generalized term <$\Psi,\sigma,\emptyset$>, the instance extraction rule (IE) resulting from an instance generation rule (IG) and an instance subtraction rule (IS), the instance generation rule being defined as:

$$(IG)\ \frac{\Psi<\sigma,\Lambda>}{\Psi<\sigma\mu,\Lambda*\sigma\mu>}$$

and the instance subtraction rule being defined as:

$$(IS)\Psi<\sigma,\Lambda> \rightarrow \Psi<\sigma,\Lambda\cup\{\sigma\mu\}>$$

wherein the triplet $\Psi$<$\sigma,\Lambda$> is replaced with $\Psi$<$\sigma,\Lambda\cup\{\sigma\mu\}$>, thereby resulting in a current set ($\Sigma$);

(3) means for searching whether the current set has a complete spanning set of near-quasi-connections, a near-quasi-connection having most general unifiers and most general half-unifiers, a most general half-unifier being defined as a half-unifier yielding a most general instance and a half-unifier of the term $\Psi$ for a term $\Phi$ being defined as a substitution $\sigma$ such that the instance $\Psi\sigma$ is an instance of $\Phi$, a near-quasi-connection being defined when the most general unifiers and most general half-unifiers thereof contain only unit substitutions which associate variables to variables (4) means for reusing the elements defined by (2) and (3) above until the current set has a complete spanning set of near-quasi-connections; and (5) means for determining the unsatisfiability of the set of input terms when the current set has a complete spanning set of near-quasi-connections.

20. A computer-readable medium according to claim 19, further including means for modifying the instance generation rule (IG) to become a half-link generation rule defined by $$(HIG)\ \frac{\Psi,\Phi}{\Psi\sigma 1,\Phi\sigma 2}$$

where $\sigma 1$ and $\sigma 2$ are two complementary most general half-unifiers of the literals of a link between the term $\Psi$ and another term $\Phi$, a most general half-unifier being defined as a half-unifier yielding a most general instance and a half-unifier of the term $\Psi$ for the term $\Phi$ being defined as a substitution $\sigma$ such that the instance $\Psi\sigma$ is an instance of $\Phi$.

21. A computer-readable medium according to claim 19, wherein the input terms are superclauses, a superclause being defined as a list or a set of superliterals which are themselves a list or a set of literals.

22. A computer-readable medium according to claim 19, wherein the means defined by element (2) further comprises means for computing most general half-unifiers which have in respective codomains thereof no other variables of the term upon which the half-link instance generation will be applied, except in cases where functional terms are involved.

23. A computer-readable medium according to claim 19, wherein a term of the set of input terms has a hyper-half-link when in a list of half-links of the term there is one and only one half-link of each of the literals of the term and the means defined by element (2) further includes means for replacing the substitution σ with a substitution θ associated to a valid hyper-half-link of the term Ψ, the resulting instance generation (IG) being a hyper-half-link generation.

24. A computer-readable medium according to claim 23, wherein the term is a superclause and the hyper-half-link generation further comprises means for applying a superpurity elimination strategy of eliminating hyperpure superclauses defined when a generalized superclause has no valid hyper-half-link.

25. A computer-implemented method of automated proving for unrestricted first-order logic to test the unsatisfiability of a set of input terms (Ψ) representative of clauses or superclauses, the set of input terms describing a knowledge based system, the method comprising the steps of:

(1) mapping in a computer each of the input terms (Ψ) onto an equivalent generalized term defined as a triplet <Ψ,ε,∅>, where ε is an empty substitution and ∅ is an empty set, to form a set (Σ) of generalized terms;

(2) applying, in the computer, to the set (Σ) an instance extraction rule (IE) defined as follows:

$$(IE)\ 93 \rightarrow (\Sigma - \{\Psi < \sigma, \Lambda >\}) \cup \{\Psi < \sigma\mu, \Lambda * \sigma\mu >, \Psi < \sigma, \Lambda \cup \{\sigma\mu\} >\}$$

where σ is a substitution, Λ is a finite set of standard substitutions $\{\lambda_1, \ldots, \lambda_v\}$, the doublet <σ, Λ> is a generalized substitution which maps a standard term onto a generalized term defined as a triplet <Ψ,σ,Λ> such that <Ψ,σ,Λ>=Ψ<σ,Λ>, μ is a substitution valid for the generalized term Ψ<σ,Λ> and Ψσ is an instance of Ψ yielded by the substitution σ and is a standard term equivalent to the generalized term <Ψ, σ, ∅>, the instance extraction rule (IE) resulting from an instance generation rule (IG) and an instance subtraction rule (IS), the instance generation rule being defined as:

$$(IG)\ \frac{\Psi < \sigma, \Lambda >}{\Psi < \sigma\mu, \Lambda * \sigma\mu >}$$

and the instance subtraction rule being defined as:

$$(IS)\Psi < \sigma, \Lambda > \rightarrow \Psi < \sigma, \Lambda \cup \{\sigma\mu\} >$$

meaning that the triplet Ψ<σ, Λ> should be replaced with Ψ<σ,Λ∪{σμ}>, the step (2) resulting in a current set (Σ);

(3) generating, in the computer, a ground instance GIG(Σ) of the current set Σ, the ground instance generation GIG being a ground substitution replacing every variable with a same fixed constant and defined by the rule:

$$(GIG)\ \frac{\Psi}{\Psi_{gr}}$$

where $\Psi_{gr}$ is a ground instance of term Ψ, the ground instance $\Psi_{gr}$ being obtained by replacing every variable with a same fixed constant;

(4) applying and repeating steps (2) and (3) in the computer until the ground instance GIG(Σ) of the current set (Σ) is unsatisfiable;

(5) determining, in the computer, the unsatisfiability of the set of input terms when the ground instance GIG(Σ) is unsatisfiable; and (6) developing the knowledge based system using information on the unsatisfiability of the input terms.

26. A computer-implemented method of automated proving for unrestricted first-order logic to test the unsatisfiability of a set of input terms (Ψ) representative of clauses or superclauses, the set of input terms describing a database system, the method comprising the steps of:

(1) mapping in a computer each of the input terms (Ψ) onto an equivalent generalized term defined as a triplet <Ψ,ε,∅>, where ε is an empty substitution and ∅ is an empty set, to form a set (Σ) of generalized terms;

(2) applying, in the computer, to the set (Σ) an instance extraction rule (IE) defined as follows:

$$(IE)\Sigma \rightarrow (\Sigma - \{\Psi < \sigma, \Lambda >\}) \cup \{\Psi < \sigma\mu, \Lambda * \sigma\mu >, \Psi < \sigma, \Lambda \cup \{\sigma\mu\} >\}$$

where σ is a substitution, Λ is a finite set of standard substitutions $\{\lambda_1, \ldots, \lambda_v\}$, the doublet <σ, Λ> is a generalized substitution which maps a standard term onto a generalized term defined as a triplet <Ψ,σ,Λ> such that <Ψ,σ,Λ>=Ψ<σ,Λ>, μ is a substitution valid for the generalized term Ψ<σ,Λ> and Ψσ is an instance of Ψ yielded by the substitution σ and is a standard term equivalent to the generalized term <Ψ, σ, ∅>, the instance extraction rule (IE) resulting from an instance generation rule (IG) and an instance subtraction rule (IS), the instance generation rule being defined as:

$$(IG)\ \frac{\Psi < \sigma, \Lambda >}{\Psi < \sigma\mu, \Lambda * \sigma\mu >}$$

and the instance subtraction rule being defined as:

$$(IS)\Psi < \sigma, \Lambda > \rightarrow \Psi < \sigma, \Lambda \cup \{\sigma\mu\} >$$

meaning that the triplet Ψ<σ, Λ> should be replaced with Ψ<σ,Λ∪{σμ}>, the step (2) resulting in a current set (3) generating, in the computer, a ground instance GIG(Σ) of the current set Σ, the ground instance generation GIG being a ground substitution replacing every variable with a same fixed constant and defined by the rule:

$$(GIG)\ \frac{\Psi}{\Psi_{gr}}$$

where $\Psi_{gr}$ is a ground instance of term Ψ, the ground instance $\Psi_{gr}$ being obtained by replacing every variable with a same fixed constant;

(4) applying and repeating steps (2) and (3) in the computer until the ground instance GIG(Σ) of the current set (Σ) is unsatisfiable;

(5) determining, in the computer, the unsatisfiability of the set of input terms when the ground instance GIG(Σ) is unsatisfiable; and (6) developing the database system using information on the unsatisfiability of the input terms.

27. A computer-implemented method of automated proving for unrestricted first-order logic to test the unsatisfiability of a set of input terms (Ψ) representative of clauses or superclauses, the set of input terms describing a hardware co-processor, the method comprising the steps of:

(1) mapping in a computer each of the input terms (Ψ) onto an equivalent generalized term defined as a triplet <Ψ,ε,∅>, where ε is an empty substitution and ∅ is an empty set, to form a set (Σ) of generalized terms;

(2) applying, in the computer, to the set ($\Sigma$) an instance extraction rule (IE) defined as follows:

$$(IE) \Sigma \rightarrow (\Sigma - \{\Psi<\sigma,\Lambda\}) \cup \{\Psi<\sigma\mu,\Lambda*\sigma\mu>,\Psi<\sigma,\Lambda\cup\{\sigma\mu\}>\}$$

where $\sigma$ is a substitution, $\Lambda$ is a finite set of standard substitutions $\{\lambda_1, \ldots, \lambda_v\}$, the doublet $<\sigma, \Lambda>$ is a generalized substitution which maps a standard term onto a generalized term defined as a triplet $<\Psi,\sigma,\Lambda>$ such that $<\Psi,\sigma,\Lambda>=\Psi<\sigma,\Lambda>$, $\mu$ is a substitution valid for the generalized term $\Psi<\sigma,\Lambda>$ and $\Psi\sigma$ is an instance of $\Psi$ yielded by the substitution $\sigma$ and is a standard term equivalent to the generalized term $<\Psi, \sigma, \emptyset>$, the instance extraction rule (IE) resulting from an instance generation rule (IG) and an instance subtraction rule (IS), the instance generation rule being defined as:

$$(IG) \frac{\Psi<\sigma,\Lambda>}{\Psi<\sigma\mu, \Lambda*\sigma\mu>}$$

and the instance subtraction rule being defined as:

$$(IS) \Psi<\sigma,\Lambda> \rightarrow \Psi<\sigma,\Lambda\cup\{\sigma\mu\}>$$

meaning that the triplet $\Psi<\sigma, \Lambda>$ should be replaced with $\Psi<\sigma,\Lambda\cup\{\sigma\mu\}>$, the step (2) resulting in a current set ($\Sigma$);

(3) generating, in the computer, a ground instance GIG($\Sigma$) of the current set $\Sigma$, the ground instance generation GIG being a ground substitution replacing every variable with a same fixed constant and defined by the rule:

$$(GIG) \frac{\Psi}{\Psi_{gr}}$$

where $\Psi_{gr}$ is a ground instance of term $\Psi$, the ground instance $\Psi_{gr}$ being obtained by replacing every variable with a same fixed constant;

(4) applying and repeating steps (2) and (3) in the computer until the ground instance GIG($\Sigma$) of the current set ($\Sigma$) is unsatisfiable;

(5) determining, in the computer, the unsatisfiability of the set of input terms when the ground instance GIG($\Sigma$) is unsatisfiable; and (6) developing the hardware co-processor using information on the unsatisfiability of the input terms.

* * * * *

UNITED STATES PATENT AND TRADEMARK OFFICE
CERTIFICATE OF CORRECTION

PATENT NO. : 6,424,962 B1
DATED : July 23, 2002
INVENTOR(S) : Billon

It is certified that error appears in the above-identified patent and that said Letters Patent is hereby corrected as shown below:

Column 39,
Line 27, delete "93" and replace with -- $\Sigma$ --;

Column 40,
Line 37, after "set", insert -- ($\Sigma$) --;

Signed and Sealed this

Tenth Day of December, 2002

JAMES E. ROGAN
*Director of the United States Patent and Trademark Office*